US012812666B2

(12) United States Patent
Hasegawa et al.

(10) Patent No.: US 12,812,666 B2
(45) Date of Patent: Nov. 24, 2026

(54) WIRELESS COMMUNICATION SYSTEM WITH RELAY TERMINAL FOR TRANSMITTING EMERGENCY WARNING INFORMATION TO A REMOTE TERMINAL

(71) Applicant: Mitsubishi Electric Corporation, Tokyo (JP)

(72) Inventors: Fumiki Hasegawa, Tokyo (JP); Tetsushi Matsuda, Tokyo (JP); Mitsuru Mochizuki, Tokyo (JP); Tadahiro Shimoda, Tokyo (JP); Shinya Makino, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 257 days.

(21) Appl. No.: 18/289,828

(22) PCT Filed: Jun. 3, 2021

(86) PCT No.: PCT/JP2021/021215
§ 371 (c)(1),
(2) Date: Nov. 7, 2023

(87) PCT Pub. No.: WO2022/254658
PCT Pub. Date: Dec. 8, 2022

(65) Prior Publication Data

US 2024/0244647 A1 Jul. 18, 2024

(51) Int. Cl.
*H04W 72/40* (2023.01)

(52) U.S. Cl.
CPC .................................. *H04W 72/40* (2023.01)

(58) Field of Classification Search
CPC ....... H04W 4/90; H04W 76/50; H04W 88/04; H04W 4/46; H04W 28/0875; H04W 72/40
See application file for complete search history.

(56) References Cited

U.S. PATENT DOCUMENTS

2015/0372774 A1 12/2015 Samuelsson et al.
2016/0330729 A1* 11/2016 Wei ...................... H04W 72/51
(Continued)

FOREIGN PATENT DOCUMENTS

CN 107211297 A 9/2017
WO WO 2016/163817 A1 10/2016
(Continued)

OTHER PUBLICATIONS

Extended European Search Report for European Application No. 21944159.9, dated Mar. 28, 2024.
(Continued)

*Primary Examiner* — Allahyar Kasraian
(74) *Attorney, Agent, or Firm* — Birch, Stewart, Kolasch & Birch, LLP

(57) ABSTRACT

In a case where a relay terminal (110) exists inside an area (102) where radio waves from a base station (101) reach while a remote terminal (130) exists outside the area (102) where the radio waves from the base station (101) reach, when receiving emergency warning information which is information for notification of an emergency situation from the base station (101), the relay terminal (110) transmits the emergency warning information to the remote terminal (130) by using a connection that has been established between the relay terminal and the remote terminal (130) for one-to-one communication using a Physical Sidelink Shared CHannel (PSSCH).

12 Claims, 11 Drawing Sheets

(56) References Cited

U.S. PATENT DOCUMENTS

| | | | | |
|---|---|---|---|---|
| 2018/0035276 | A1 | 2/2018 | Kang et al. | |
| 2018/0077552 | A1* | 3/2018 | Lee | H04W 76/27 |
| 2018/0310158 | A1 | 10/2018 | Kimura et al. | |
| 2018/0324571 | A1 | 11/2018 | Buckley et al. | |
| 2018/0338276 | A1 | 11/2018 | Kaur et al. | |
| 2019/0313375 | A1 | 10/2019 | Loehr et al. | |
| 2020/0092685 | A1* | 3/2020 | Fehrenbach | H04W 72/23 |
| 2021/0105119 | A1 | 4/2021 | Sarkis et al. | |
| 2022/0070829 | A1 | 3/2022 | Kusashima et al. | |
| 2022/0109969 | A1* | 4/2022 | Qaisrani | H04W 4/80 |
| 2022/0110187 | A1* | 4/2022 | Qaisrani | H04W 40/22 |
| 2022/0182807 | A1* | 6/2022 | Buckley | H04W 76/14 |
| 2022/0182970 | A1* | 6/2022 | Wang | H04W 72/0453 |

FOREIGN PATENT DOCUMENTS

| | | |
|---|---|---|
| WO | WO 2017/081907 A1 | 5/2017 |
| WO | WO 2020/030767 A1 | 2/2020 |
| WO | WO 2020/033088 A1 | 2/2020 |
| WO | WO 2020/166280 A1 | 8/2020 |

OTHER PUBLICATIONS

Indian Office Action for Indian Application No. 202347076520, dated Apr. 24, 2025, with English translation.

Japanese Office Action for Japanese Application No. 2023-525282, dated Dec. 17, 2024, with English translation.

3GPP TR 38.836 v2.0.0 (Mar. 2021), 3rd Generation Partnership Project; Technical Specification Group Radio Access Network; Study on NR sidelink relay, total 28 pages.

3GPP TS 22.168 V9.0.0 (Jun. 2008), 3rd Generation Partnership Project; Technical Specification Group Services and System Aspects; Earthquake and Tsunami Warning System (ETWS) requirements, total 12 pages.

3GPP TS 22.268 V16.4.0 (Sep. 2020), 3rd Generation Partnership Project; Technical Specification Group Services and System Aspects; Public Warning System (PWS) requirements, total 20 pages.

3GPP TS 23.303 V16.0.0 (Jul. 2020), 3rd Generation Partnership Project; Technical Specification Group Services and System Aspects; Proximity-based services (ProSe), total 130 pages.

Apple, KI#3, Sol #7: Update for support of IMS Emergency Services over L2 relay [online], 3GPP TSG, SA WG2 Meeting #141E, S2-2007730, Oct. 23, 2020, total 6 pages.

International Search Report for PCT/JP2021/021215 (PCT/ISA/210) mailed on Aug. 31, 2021.

Musaka et al., “Emergency Warning System Integrating Proximity Services for Broadcasting Early Warnings to UEs Outside eNB Coverage”, Journal of the Information Processing Society of Japan, Feb. 2019, vol. 60, No. 2, pp. 514-526.

Japanese Office Action for Japanese Application No. 2023-525282, dated May 7, 2024, with English translation.

Japanese Office Action for Japanese Application No. 2023-525282, dated Sep. 3, 2024, with an English translation.

Indian Office Action for Indian Application No. 202347076520, dated Jun. 4, 2026, with partial English translation.

European Communication pursuant to Article 94(3) EPC for European Application No. 21 944 159.9, dated Jul. 15, 2026.

* cited by examiner

| ETWS INFORMATION | TRANSMISSION END TIME |
|---|---|
| CONTENTS1 OF SIB6 | JANUARY 31, 2021 10:00:15 |
| CONTENTS2 OF SIB6 | JANUARY 31, 2021 10:00:20 |
| CONTENTS1 OF SIB7 | JANUARY 31, 2021 10:00:17 |
| CONTENTS2 OF SIB7 | JANUARY 31, 2021 10:00:22 |

WIRELESS COMMUNICATION SYSTEM WITH RELAY TERMINAL FOR TRANSMITTING EMERGENCY WARNING INFORMATION TO A REMOTE TERMINAL

TECHNICAL FIELD

The present disclosure relates to a communication system, a mobile terminal, a program, and a communication method.

BACKGROUND ART

Conventionally, there have been technologies for transmitting emergency information from the base station of a mobile phone network to mobile terminals. For example, Public Warning System (PWS) is a system that transmits to mobile terminals through the base station emergency warning information standardized by the Third Generation Partnership Project (3GPP). In addition, Earthquake and Tsunami Warning System (ETWS) is a system that transmits ETWS information, which is warning information regarding earthquakes and tsunamis, by utilizing the PWS mechanism.

By following the ETWS procedure, a mobile terminal capable of communicating directly with the base station can receive ETWS information. However, mobile terminals existing in areas where radio waves from the base station cannot reach fail to receive the ETWS information in the ETWS procedure. Taking into account the importance of ETWS information, which is concerned with human safety, it is considered desirable to enable the transmission of the ETWS information to mobile terminals existing in areas where the radio waves from the base station cannot reach.

In the 3GPP Fifth Generation New Radio (5G NR), in order to transmit the ETWS information to mobile terminals existing in the areas where the radio waves from the base station cannot reach, there is proposed a User Equipment (UE)-to-Network Relay system using Side Link Relay communication in Proximity-based Services (ProSe) as described in Non-Patent Reference 1.

In the UE-to-Network Relay system, a remote terminal, which is a mobile terminal existing in the area where the radio waves from the base station cannot reach, communicates with the base station by utilizing a relay function provided by a relay terminal, which is a mobile terminal capable of communicating directly with the base station. For example, the relay terminal has the function of transferring short message information and the function of transferring system information including SIB1, SIB6 and SIB7, to the remote terminal. When receiving the short message, SIB1, SIB6 and SIB7 transmitted by the base station for ETWS, the relay terminal uses these functions to relay and transmit those information to the remote terminal. The remote terminal acquires the ETWS information based on the contents of the short message, SIB1, SIB6 and SIB7 relayed and transmitted by the relay terminal.

PRIOR ART REFERENCE

Non-Patent Reference

Non-PATENT REFERENCE 1: 3GPP TS 23.303 Proximity-based services

SUMMARY OF THE INVENTION

Problem to be Solved by the Invention

In the conventional UE-to-Network Relay system, the base station, relay terminal, and remote terminal all need to be compatible with the UE-to-Network Relay system.

Since the base station is a device that is used in infrastructure facilities of the mobile phone network for a long time, it may take time for the base station to become compatible with the UE-to-Network Relay system for 5G NR, which is being newly standardized by the 3GPP. Thus, it may also take time for the mobile phone network environment to be ready to transmit ETWS information to remote terminals using the conventional system.

Therefore, one or more aspects of the present disclosure have an object to allow a relay terminal to transmit emergency warning information to a remote terminal even when a base station is not compatible with the UE-to-Network Relay system.

Means of Solving the Problem

A communication system according to a first aspect of the present disclosure is provided to conduct Side Link Relay communication of Fifth Generation New Radio (5G NR) specified by a Third Generation Partnership Project (3GPP), the communication system including: a base station; a first mobile terminal; and a second mobile terminal capable of communicating with the first mobile terminal by using Proximity-based Services (ProSe), wherein, in a case where the first mobile terminal exists inside an area where radio waves from the base station reach while the second mobile terminal exists outside the area where the radio waves from the base station reach, when the first mobile terminal receives emergency warning information from the base station, the first mobile terminal transmits the emergency warning information to the second mobile terminal by using a connection that has been established between the first mobile terminal and the second mobile terminal for one-to-one communication using a Physical Sidelink Shared CHannel (PSSCH), the emergency warning information being information for notification of an emergency situation.

A communication system according to a second aspect of the present disclosure is provided to conduct Side Link Relay communication of Fifth Generation New Radio (5G NR) specified by a Third Generation Partnership Project (3GPP), the communication system including: a base station; a first mobile terminal; and a second mobile terminal capable of communicating with the first mobile terminal by using Proximity-based Services (ProSe), wherein, in a case where the first mobile terminal exists inside an area where radio waves from the base station reach while the second mobile terminal exists outside the area where the radio waves from the base station reach, when the first mobile terminal receives emergency warning information from the base station, the first mobile terminal transmits a broadcast message including the emergency warning information to the second mobile terminal by using a Physical Sidelink Shared CHannel (PSSCH), the emergency warning information being information for notification of an emergency situation.

A communication system according to a third aspect of the present disclosure is provided to conduct Side Link Relay communication of Fifth Generation New Radio (5G NR) specified by a Third Generation Partnership Project (3GPP), the communication system including: a base station; a first mobile terminal; and a second mobile terminal capable of communicating with the first mobile terminal by using Proximity-based Services (ProSe), wherein, in a case where the first mobile terminal exists inside an area where radio waves from the base station reach while the second mobile terminal exists outside the area where the radio waves from the base station reach, when the first mobile terminal receives emergency warning information from the base station, the first mobile terminal transmits the emergency warning information to the second mobile terminal by using a connection that has been established between the first mobile terminal and the second mobile terminal for one-to-one communication using a Physical Sidelink Shared CHannel (PSSCH) and transmits a broadcast message including the emergency warning information to the second mobile terminal by using the PSSCH, the emergency warning information being information for notification of an emergency situation.

A mobile terminal according to a first aspect of the present disclosure is provided to conduct Side Link Relay communication of Fifth Generation New Radio (5G NR) specified by a Third Generation Partnership Project (3GPP), the mobile terminal including: a communication unit configured to receive emergency warning information from a base station, the emergency warning information being information for notification of an emergency situation; and a control unit configured to cause the communication unit to transmit the emergency warning information to another mobile terminal by using a connection that has been established between the mobile terminal and the another mobile terminal for one-to-one communication using a Physical Sidelink Shared CHannel (PSSCH) in a case where the another mobile terminal capable of communicating with the mobile terminal by using Proximity-based Services (ProSe) exists outside an area where radio waves from the base station reach when the communication unit receives the emergency warning information.

A mobile terminal according to a second aspect of the present disclosure is provided to conduct Side Link Relay communication of Fifth Generation New Radio (5G NR) specified by a Third Generation Partnership Project (3GPP), the mobile terminal including: a communication unit configured to receive emergency warning information from a base station, the emergency warning information being information for notification of an emergency situation; and a control unit configured to cause the communication unit to transmit a broadcast message including the emergency warning information to another mobile terminal by using a Physical Sidelink Shared CHannel (PSSCH) in a case where the another mobile terminal capable of communicating with the mobile terminal by using Proximity-based Services (ProSe) exists outside an area where radio waves from the base station reach when the communication unit receives the emergency warning information.

A mobile terminal according to a third aspect of the present disclosure is provided to conduct Side Link Relay communication of Fifth Generation New Radio (5G NR) specified by a Third Generation Partnership Project (3GPP), the mobile terminal including:

14. A mobile terminal that conducts Side Link Relay communication of Fifth Generation New Radio (5G NR) specified by a Third Generation Partnership Project (3GPP), comprising: a communication unit configured to receive emergency warning information from a base station, the emergency warning information being information for notification of an emergency situation; and a control unit configured to cause the communication unit to transmit the emergency warning information to another mobile terminal by using a connection that has been established between the mobile terminal and the another mobile terminal for one-to-one communication using a Physical Sidelink Shared CHannel (PSSCH) and causes the communication unit to transmit a broadcast message including the emergency warning information to the another mobile terminal by using the PSSCH in a case where the another mobile terminal capable of communicating with the mobile terminal by using Proximity-based Services (ProSe) exists outside an area where radio waves from the base station reach when the communication unit receives the emergency warning information.

A program according to a first aspect of the present disclosure is provided to cause a computer serving as a mobile terminal for conducting Side Link Relay communication of Fifth Generation New Radio (5G NR) specified by a Third Generation Partnership Project (3GPP) to function as: a communication unit configured to receive emergency warning information from a base station, the emergency warning information being information for notification of an emergency situation; and a control unit configured to cause the communication unit to transmit the emergency warning information to another mobile terminal by using a connection that has been established between the mobile terminal and the another mobile terminal for one-to-one communication using a Physical Sidelink Shared CHannel (PSSCH) in a case where the another mobile terminal capable of communicating with the mobile terminal by using Proximity-based Services (ProSe) exists outside an area where radio waves from the base station reach when the communication unit receives the emergency warning information.

A program according to a second aspect of the present disclosure is provided to cause a computer serving as a mobile terminal for conducting Side Link Relay communication of Fifth Generation New Radio (5G NR) specified by a Third Generation Partnership Project (3GPP) to function as: a communication unit configured to receive emergency warning information from a base station, the emergency warning information being information for notification of an emergency situation; and a control unit configured to cause the communication unit to transmit a broadcast message including the emergency warning information to another mobile terminal by using a Physical Sidelink Shared CHannel (PSSCH) in a case where the another mobile terminal capable of communicating with the mobile terminal by using Proximity-based Services (ProSe) exists outside an area where radio waves from the base station reach when the communication unit receives the emergency warning information.

A program according to a third aspect of the present disclosure is provided to cause a computer serving as a mobile terminal for conducting Side Link Relay communication of Fifth Generation New Radio (5G NR) specified by a Third Generation Partnership Project (3GPP) to function as: a communication unit configured to receive emergency warning information from a base station, the emergency warning information being information for notification of an emergency situation; and a control unit configured to cause the communication unit to transmit the emergency warning information to another mobile terminal by using a connection that has been established between the mobile terminal and the another mobile terminal for one-to-one communication using a Physical Sidelink Shared CHannel (PSSCH) and causes the communication unit to transmit a broadcast message including the emergency warning information to the another mobile terminal by using the PSSCH, in a case where the another mobile terminal capable of communicating with the mobile terminal by using Proximity-based Services (ProSe) exists outside an area where radio waves from the base station reach when the communication unit receives the emergency warning information.

A communication method according to a first aspect of the present disclosure is performed by a mobile terminal that conducts Side Link Relay communication of Fifth Generation New Radio (5G NR) specified by a Third Generation Partnership Project (3GPP), the method including: receiving emergency warning information from a base station, the emergency warning information being information for notification of an emergency situation; and transmitting the emergency warning information to another mobile terminal by using a connection that has been established between the mobile terminal and the another mobile terminal for one-to-one communication using a Physical Sidelink Shared CHannel (PSSCH) in a case where the another mobile terminal capable of communicating with the mobile terminal by using Proximity-based Services (ProSe) exists outside an area where radio waves from the base station reach when receiving the emergency warning information.

A communication method according to a second aspect of the present disclosure is performed by a mobile terminal that conducts Side Link Relay communication of Fifth Generation New Radio (5G NR) specified by a Third Generation Partnership Project (3GPP), the method including: receiving emergency warning information from a base station, the emergency warning information being information for notification of an emergency situation; and transmitting a broadcast message including the emergency warning information to another mobile terminal by using a Physical Sidelink Shared CHannel (PSSCH) in a case where the another mobile terminal capable of communicating with the mobile terminal by using Proximity-based Services (ProSe) exists outside an area where radio waves from the base station reach when receiving the emergency warning information.

A communication method according to a third aspect of the present disclosure is performed by a mobile terminal that conducts Side Link Relay communication of Fifth Generation New Radio (5G NR) specified by a Third Generation Partnership Project (3GPP), the method including: receiving emergency warning information from a base station, the emergency warning information being information for notification of an emergency situation; and transmitting the emergency warning information to another mobile terminal by using a connection that has been established between the mobile terminal and the another mobile terminal for one-to-one communication using a Physical Sidelink Shared CHannel (PSSCH) and transmitting a broadcast message including the emergency warning information to the another mobile terminal by using the PSSCH, in a case where the another mobile terminal capable of communicating with the mobile terminal by using Proximity-based Services (ProSe) exists outside an area where radio waves from the base station reach when receiving the emergency warning information.

Effects of the Invention

According to one or more aspects of the present disclosure, a relay terminal can transmit emergency warning information to a remote terminal even when a base station is not compatible with the UE-to-Network Relay system.

MODE FOR CARRYING OUT THE INVENTION

First Embodiment

Figure 1:
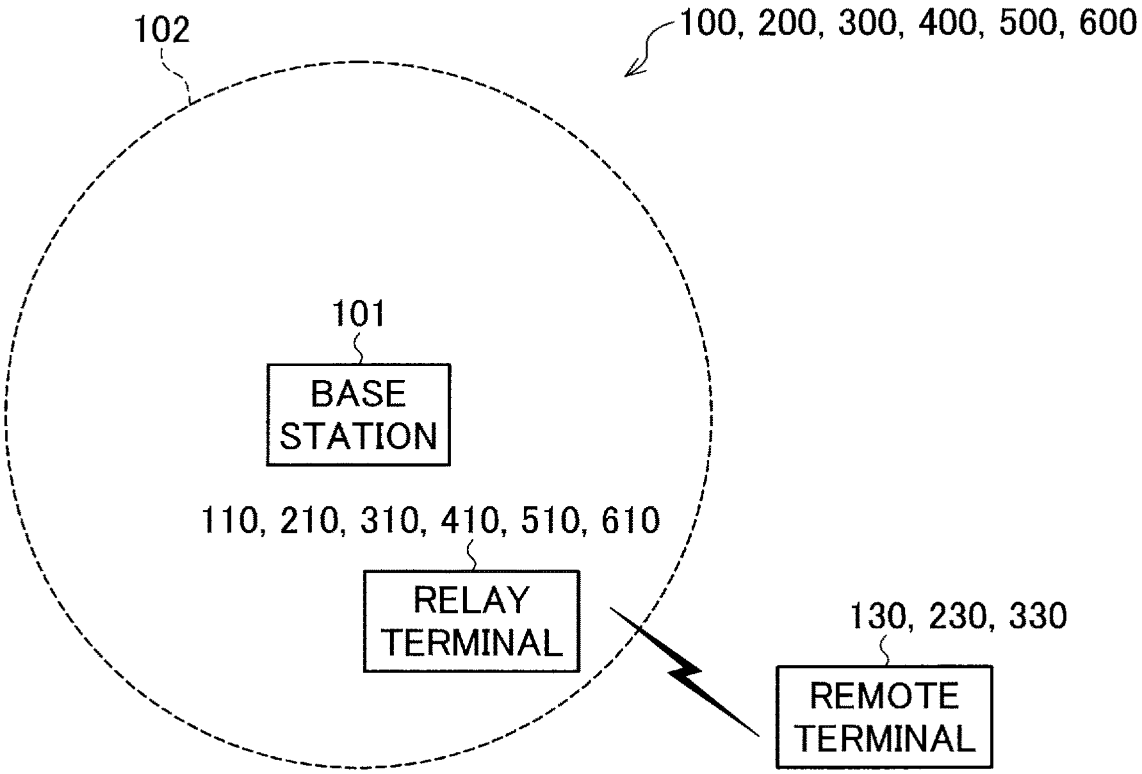
FIG. 1 is a block diagram schematically illustrating a configuration of a wireless communication system according to first to sixth embodiments.

FIG. 1 is a block diagram schematically illustrating a configuration of a wireless communication system 100 according to a first embodiment.

The wireless communication system 100 includes a relay terminal 110 and a remote terminal 130.

The wireless communication system 100 is a communication system that conducts Side Link Relay communication of Fifth Generation New Radio (5G NR) specified by a Third Generation Partnership Project (3GPP).

As illustrated in FIG. 1, the relay terminal 110 is a mobile terminal existing in an area 102 where radio waves from a base station 101 reach, while the remote terminal 130 is a mobile terminal existing in an area where the radio waves from the base station 101 do not reach. The relay terminal 110 is also referred to as a first mobile terminal, and the remote terminal 130 is also referred to as a second mobile terminal.

The relay terminal 110 can communicate directly with the base station 101, regardless of whether or not it uses a UE-to-Network Relay system, and has the function of conducting communication using ProSe.

The remote terminal 130 exists in the area where the radio waves from the base station 101 do not reach and has the function of communicating with the relay terminal 110 using the ProSe.

Figure 2:
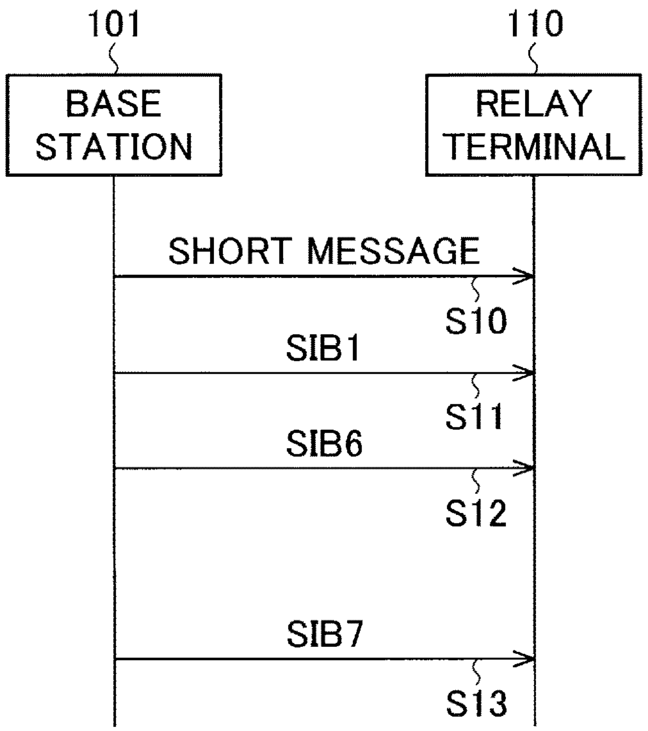
FIG. 2 is a sequence diagram illustrating a transmitting procedure of ETWS information by means of ETWS in 3GPP 5G NR, between a base station and a relay terminal existing in an area where radio waves from the base station reach.

First, emergency information transmission using PWS will be described by taking ETWS as an example with reference to FIG. 2. FIG. 2 is a sequence diagram illustrating a transmitting procedure of ETWS information by means of ETWS in 3GPP 5G NR, between the base station 101 and the relay terminal 110 existing in the area 102 where the radio waves from the base station 101 reach.

First, the base station 101 transmits a short message indicative of the existence of the ETWS information to the relay terminal 110 on the Physical Downlink Control Channel (PDCCH) communication channel (S10). Thus, the base station 101 notifies the relay terminal 110 of the existence of the ETWS information.

The relay terminal 110 that has received the short message indicative of the existence of the ETWS information receives a System Information Block (SIB) 1 transmitted on a Broadcast Control Channel (BCCH), which is a communication channel for notification, in order to receive information indicative of the transmission timing of the ETWS information (S11). Thus, the relay terminal 110 can know the transmission timing of SIB6 and SIB7, which indicate the ETWS information, on the BCCH from the contents of the received SIB1.

The relay terminal 110 receives the SIB6 and SIB7 on the BCCH based on the transmission timing of the SIB6 and SIB7 on the BCCH known in step S11 (S12 , S13). Thus, the relay terminal 110 can acquire the ETWS information.

If a mobile terminal exists in the area 102 where the radio waves from the base station 101 reach, the ETWS information can be transmitted from the base station 101 to the mobile terminal in the above-mentioned procedure.

Next, a description will be given on a case where the ETWS information is transmitted to a mobile terminal that exists in the area where the radio waves from the base station 101 cannot reach.

In the first embodiment, in a case where the relay terminal 110 exists inside the area 102 where the radio waves from the base station 101 reach while the remote terminal 130 exists outside the area 102 where the radio waves from the base station 101 reach, when receiving the emergency warning information, which is information for notification of an emergency situation, from the base station 101, the relay terminal 110 transmits the emergency warning information to the remote terminal 130 by using the connection that has been established between the remote terminal 130 and the relay terminal 110 for one-to-one communication using PSSCH.

Here, in the first embodiment, the connection between the relay terminal 110 and the remote terminal 130 is assumed to be established before the receiving of the emergency warning information.

The connection between the relay terminal 110 and the remote terminal 130 is assumed to be established at timing different from the timing of transmitting system information when the relay terminal 110 is supposed to transmit the system information to the remote terminal 130.

Figure 3:
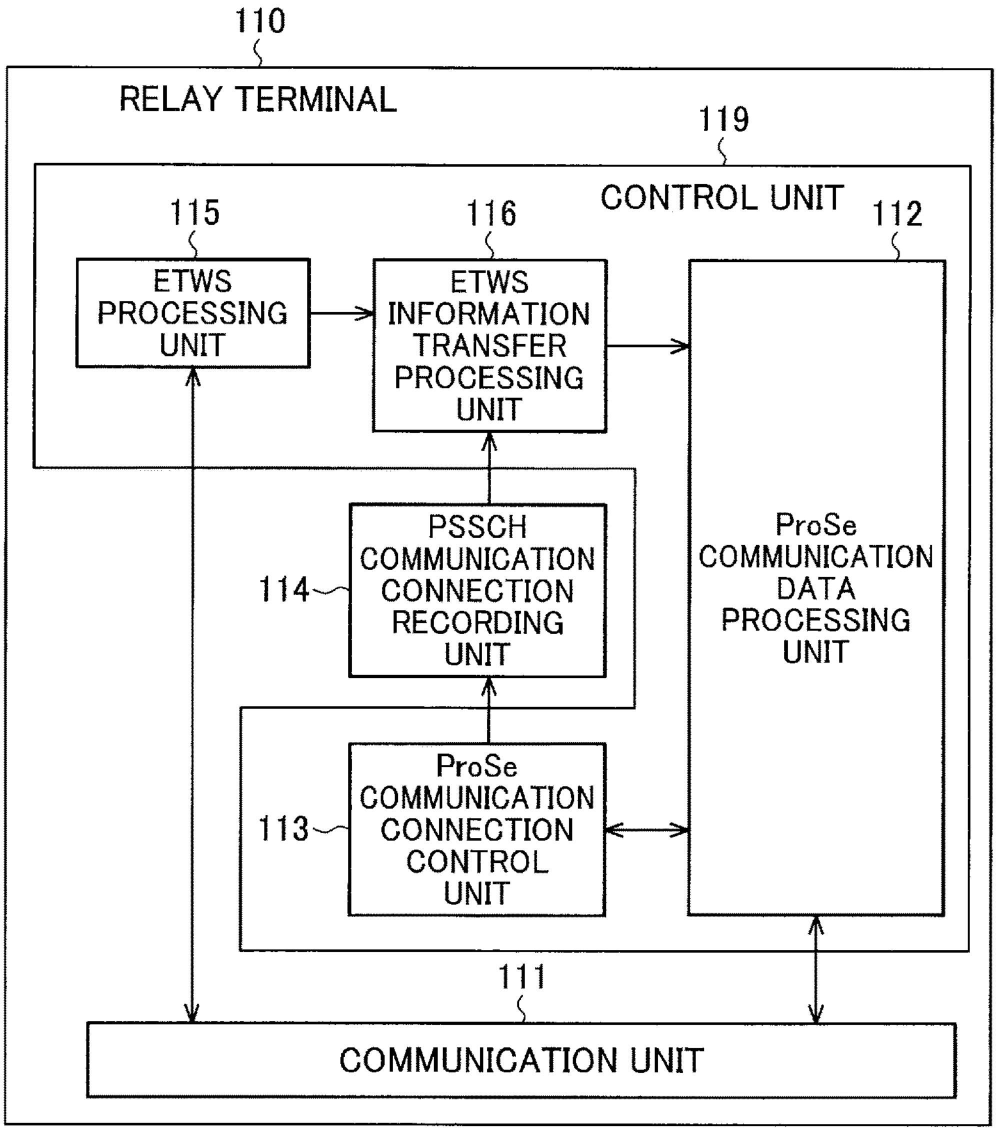
FIG. 3 is a block diagram schematically illustrating a configuration of a relay terminal in the first embodiment.

FIG. 3 is a block diagram schematically illustrating a configuration of the relay terminal 110 in the first embodiment.

The relay terminal 110 has a communication unit 111, a ProSe communication data processing unit 112, a ProSe communication connection control unit 113, a PSSCH communication connection recording unit 114, an ETWS processing unit 115, and an ETWS information transfer processing unit 116.

The communication unit 111 communicates with the base station 101 and the remote terminal 130. For example, the communication unit 111 transmits messages with a data plane and a control plane to the remote terminal 130 on the communication channel used by the ProSe. The communication unit 111 also receives, from the base station 101, the ETWS information, which has been transmitted by the base station 101 by using the short message and the BCCH.

The ProSe communication data processing unit 112 processes a communication protocol for transmitting messages with the data plane and the control plane on the communication channel used by the ProSe. The ProSe communication data processing unit 112 passes, to the ProSe communication connection control unit 113, a necessary piece (s) (e.g., a control plane message) of data received by the communication unit 111 on the communication channel used by the ProSe.

The ProSe Communication Connection Control Unit 113 processes communication messages of the control plane for establishing, releasing, etc., of the connection; the communication messages are necessary for the communication on the communication channel used by the ProSe.

The PSSCH communication connection recording unit 114 records information on the remote terminal 130 to which the relay terminal 110 is currently connected as a result of the control plane processing for the establishing and releasing of the connection that has been performed by the ProSe communication connection control unit 113.

The ETWS processing unit 115 passes the ETWS information received by the communication unit 111 to the ETWS information transfer processing unit 116.

Upon receiving the ETWS information from the ETWS processing unit 115, the ETWS information transfer processing unit 116 requests the Prose communication data processing unit 112 to transmit, on the PSSCH, an ETWS communication message including the ETWS information to the remote terminal 130 where the connection for the one-to-one communication using PSSCH has been established, based on the information recorded in the PSSCH communication connection recording unit 114.

Here, the ProSe communication data processing unit 112, ProSe communication connection control unit 113, ETWS processing unit 115 and ETWS information transfer processing unit 116 are also referred to as a control unit 119.

In a case where the remote terminal 130, which is another mobile terminal capable of communicating with the relay terminal 110 by using the ProSe, exists outside the area 102 where the radio waves from the base station 101 reach when receiving the emergency warning information, the control unit 119 causes the communication unit 111 to transmit the emergency warning information to the remote terminal 130 by using the connection that has been established between the relay terminal 110 and the remote terminal 130 for the one-to-one communication using the PSSCH.

Figure 4A:
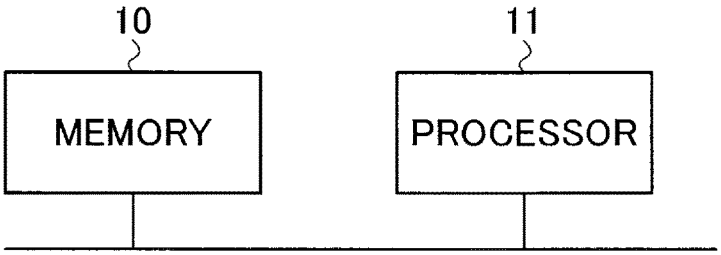
FIGS. 4A and 4B are block diagrams illustrating examples of hardware configurations.

As illustrated in FIG. 4A, for example, some or all of the ProSe communication data processing unit 112, ProSe communication connection control unit 113, ETWS processing unit 115, and ETWS information transfer processing unit 116 described above can be composed of a memory 10 and a processor 11 such as a Central Processing Unit (CPU) that executes a program stored in the memory 10. Such a program may be provided through a network or may be recorded and provided on a recording medium. That is, such a program may be provided, for example, as a program product. In other words, the relay terminal 110 can be implemented by a computer.

Figure 4B:
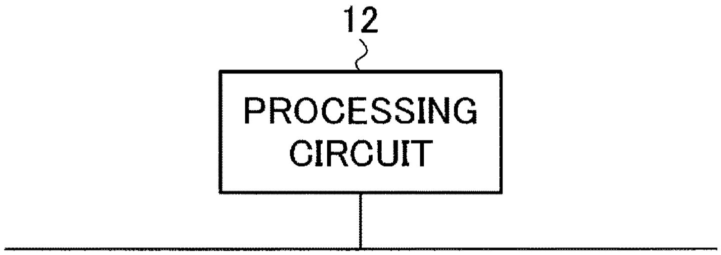

As shown in FIG. 4B, for example, some or all of the ProSe communication data processing unit 112, ProSe communication connection control unit 113, ETWS processing unit 115, and ETWS information transfer processing unit 116 can also be composed of a processing circuit 12, such as a single circuit, a complex circuit, a processor operating on a program, a parallel processor operating on a program, an Application Specific Integrated Circuit (ASIC) or a Field Programmable Gate Array (FPGA).

As described above, the ProSe communication data processing unit 112, ProSe communication connection control unit 113, ETWS processing unit 115, and ETWS information transfer processing unit 116 can be implemented by processing circuitry.

Furthermore, the communication unit 111 can be implemented by a wireless communication interface having a wireless communication function.

The PSSCH communication connection recording unit 114 can be implemented by a volatile or non-volatile memory.

Figure 5:
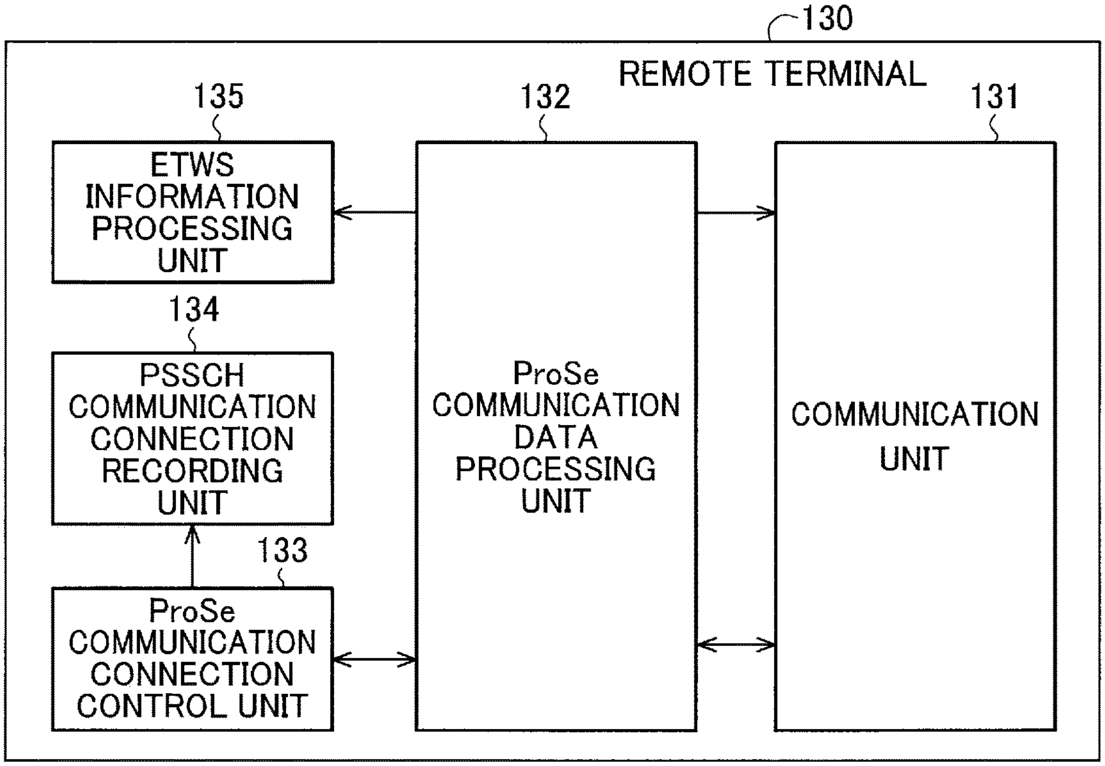
FIG. 5 is a block diagram schematically illustrating a configuration of a remote terminal in the first embodiment.

FIG. 5 is a block diagram schematically illustrating a configuration of the remote terminal 130 in the first embodiment.

The remote terminal 130 has a communication unit 131, a ProSe communication data processing unit 132, a ProSe communication connection control unit 133, a PSSCH communication connection recording unit 134, and an ETWS information processing unit 135.

The communication unit 131 communicates with the base station 101 and the relay terminal 110. Here, since the remote terminal 130 exists in the area where the radio waves from the base station 101 do not reach, the communication unit 131 cannot communicate with the base station 101 but communicates with the relay terminal 110. For example, the communication unit 131 transmits messages with a data plane and a control plane on the communication channel used by the ProSe.

The ProSe communication data processing unit 132 processes a communication protocol for transmitting messages with the data plane and the control plane on the communication channel used by the ProSe. For example, the ProSe communication data processing unit 132 passes an ETWS notification message received on the PSSCH to the ETWS information processing unit 135, and also passes, to the ProSe communication connection control unit 133, a necessary piece(s) (e.g., a control plane message) of the data received on the communication channel used by the ProSe.

The ProSe Communication Connection Control Unit 133 processes communication messages of the control plane for establishing, releasing, etc., of the connection; the communication messages are necessary for the communication on the communication channel used by the ProSe.

The PSSCH communication connection recording unit 134 records information on the relay terminal 110 to which the remote terminal 130 is currently connected as a result of the control plane processing for the establishing and releasing of the connection performed by the ProSe communication connection control unit 133.

The ETWS information processing unit 135 processes an ETWS notification message received from the ProSe communication data processing unit 132.

As illustrated in FIG. 4A, for example, some or all of the ProSe communication data processing unit 132, ProSe communication connection control unit 133, and ETWS information processing unit 135 described above can be composed of the memory 10 and the processor 11, such as a CPU, that executes a program stored in the memory 10. Such a program may be provided through a network or may be recorded and provided on a recording medium. That is, such a program may be provided, for example, as a program product. In other words, the remote terminal 130 can be implemented by a computer.

As shown in FIG. 4B, for example, some or all of the ProSe communication data processing unit 132, ProSe communication connection control unit 133, and ETWS information processing unit 135 can also be composed of a processing circuit 12, such as a single circuit, a complex circuit, a processor operating on a program, a parallel processor operating on a program, or an ASIC or FPGA.

As described above, the ProSe communication data processing unit 132, ProSe communication connection control unit 133, and ETWS information processing unit 135 can be implemented by processing circuitry.

Furthermore, the communication unit 131 can be implemented by a wireless communication interface having the wireless communication function.

The PSSCH communication connection recording unit 134 can be implemented by a volatile or non-volatile memory.

Figure 6:
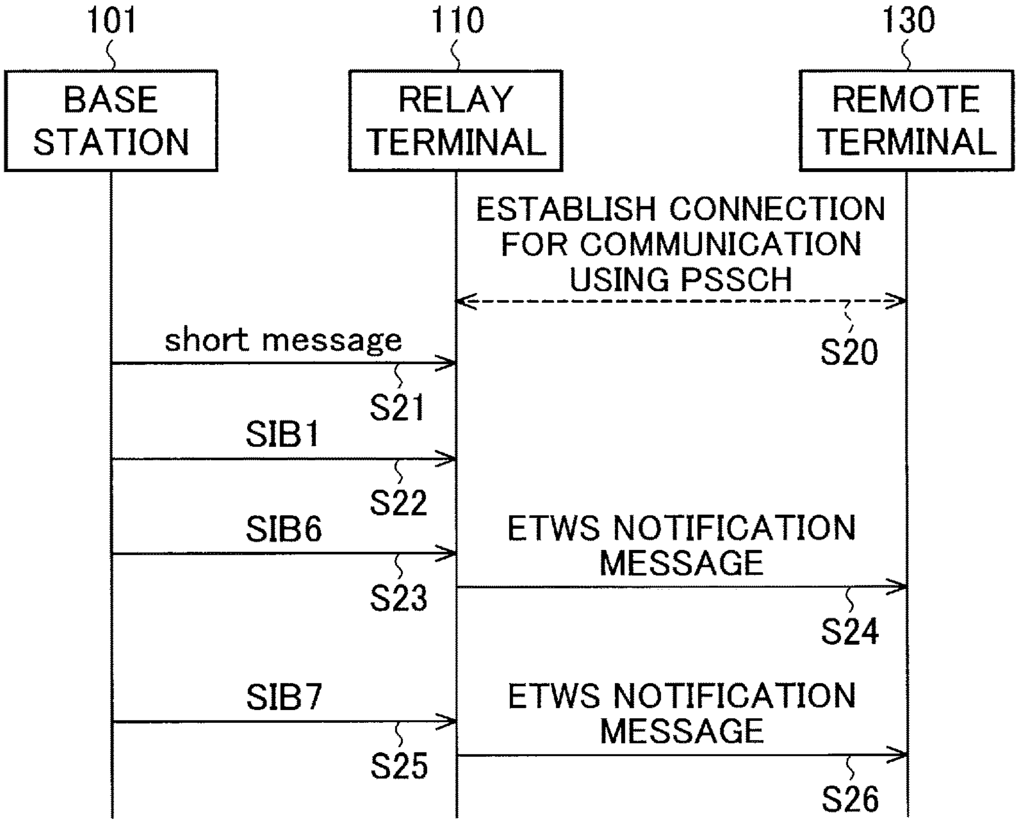
FIG. 6 is a sequence diagram illustrating a communication procedure of the ETWS information in the first embodiment.

FIG. 6 is a sequence diagram illustrating a communication procedure of the ETWS information in the first embodiment.

First, according to some trigger, the remote terminal 130 and the relay terminal 110 establish a connection to achieve the one-to-one communication between them by using the PSSCH (S20).

Specifically, at the remote terminal 130, the ProSe communication connection control unit 133 utilizes the ProSe communication data processing unit 132 and the communication unit 131 to transmit and receive control messages for establishing the connection for the one-to-one communication using the PSSC to and from the relay terminal 110. At the relay terminal 110, the ProSe communication connection control unit 113 utilizes the ProSe communication data processing unit 112 and the communication unit 111 to transmit and receive control messages for establishing the connection for the one-to-one communication using the PSSCH to and from the remote terminal 130.

When the exchange of a control message according to the protocol for establishing the connection is completed, the ProSe communication connection control unit 133 of the remote terminal 130 records information regarding the connection with the relay terminal 110 in the PSSCH communication connection recording unit 134. Further, the ProSe communication connection control unit 113 of the relay terminal 110 records information regarding the connection with the remote terminal 130, in the PSSCH communication connection recording unit 114.

Next, the base station 101 transmits a short message indicative of the existence of the ETWS information to the relay terminal 110, on the PDCCH (S21). Thus, the base station 101 notifies the relay terminal 110 of the existence of the ETWS information.

Here, the communication unit 111 of the relay terminal 110 receives the short message, and the ETWS processing unit 115 recognizes that the ETWS information is to be notified.

The relay terminal 110 that has received the short message indicative of the existence of the ETWS information receives an SIB1 transmitted on the BCCH in order to receive information indicative of the transmission timing of the ETWS information (S22).

For example, the communication unit 111 of the relay terminal 110 receives the SIB1 transmitted on the BCCH in order to receive information indicative of the transmission timing of the ETWS information. The received SIB1 is then given to the ETWS processing unit 115. Thus, the ETWS processing unit 115 can know the transmission timing of the SIB6 and SIB7 indicative of the ETWS information on the BCCH from the contents of the received SIB1.

Based on the transmission timing of the SIB6 on the BCCH that has been known in step S22, the relay terminal 110 receives the SIB6 on the BCCH (S23). For example, at the transmission timing of the SIB6 on the BCCH that has been known in step S22, the ETWS processing unit 115 causes the communication unit 111 to obtain the SIB6 on the BCCH to obtain the SIB6.

The relay terminal 110 transmits an ETWS notification message including the contents of the received SIB6 to the remote terminal 130 by using the connection for the one-to-one communication using the PSSCH (S24).

For example, the ETWS processing unit 115 passes the contents of the SIB6 received in step S23 to the ETWS information transfer processing unit 116. The ETWS information transfer processing unit 116 generates an ETWS notification message including the contents of the passed SIB6, and causes the ProSe communication data processing unit 112 and the communication unit 111 to transmit the ETWS notification message with the connection for the one-to-one communication using the PSSCH, to the remote terminal 130 where the connection for the one-to-one communication using the PSSCH has already been established in step S20. Specifically, the ETWS information transfer processing unit 116 reads information on the connected remote terminal 130, which has been recorded in the PSSCH communication connection recording unit 114, passes the ETWS notification message to the ProSe communication data processing unit 112, and requests the ProSe communication data processing unit 112 to transmit the ETES notification message to the remote terminal 130 on the PSSCH.

The remote terminal 130 then acquires ETWS information from the contents of the SIB6 included in the received ETWS notification message. Specifically, the ETWS information processing unit 135 processes the contents of the SIB6 included in the received ETWS notification message as earthquake tsunami warning information.

Based on the transmission timing of the SIB7 on the BCCH that has been known in step S22, the relay terminal 110 receives the SIB7 on the BCCH (S25). For example, at the transmission timing of the SIB7 on the BCCH that has been known in step S22, the ETWS processing unit 115 causes the communication unit 111 to receive the SIB7 on the BCCH to obtain the SIB7.

The relay terminal 110 transmits an ETWS notification message including the contents of the received SIB7 to the remote terminal 130 by using the connection for the one-to-one communication using the PSSCH (S26).

For example, the ETWS processing unit 115 passes the contents of the SIB7 received in step S25 to the ETWS information transfer processing unit 116. The ETWS information transfer processing unit 116 generates an ETWS notification message including the contents of the passed SIB7, and causes the ProSe communication data processing unit 112 and the communication unit 111 to transmit the ETWS notification message with the connection for the one-to-one communication using the PSSCH, to the remote terminal 130 where the connection for the one-to-one communication using the PSSCH has already been established in step S20. Specifically, the ETWS information transfer processing unit 116 reads information on the connected remote terminal 130, which has been recorded in the PSSCH communication connection recording unit 114, passes the ETWS notification message to the ProSe communication data processing unit 112, and requests the ProSe communication data processing unit 112 to transmit the ETES notification message to the remote terminal 130 on the PSSCH.

The remote terminal 130 then acquires the ETWS information from the contents of the SIB7 included in the received ETWS notification message. Specifically, the ETWS information processing unit 135 processes the contents of the SIB7 included in the received ETWS notification message as the earthquake tsunami warning information.

As described above, the ETWS information can be transmitted to the remote terminal 130 even when the base station 101, relay terminal 110, and remote terminal 130 are not compatible with the UE-to-Network Relay system.

By combining the above first embodiment and the system described in Patent Reference 1 or system described in the following reference, the relay terminal 110 can transmit the ETWS information to the remote terminal 130 using a plurality of communication methods.

Journal of the Information Processing Society of Japan Vol. 60 No. 2 514-526 (February 2019)

Second Embodiment

As illustrated in FIG. 1, a wireless communication system 200 according to a second embodiment includes a relay terminal 210 and a remote terminal 230.

In the second embodiment, in a case where the relay terminal 210 exists inside the area 102 where the radio waves from the base station 101 reach while the remote terminal 230 exists outside the area 102 where the radio waves from the base station 101 reach, when receiving the emergency warning information, which is information for the notification of an emergency situation, from the base station 101, the relay terminal 210 transmits a broadcast message including the emergency warning information to the remote terminal 230 by using the PSSCH.

Here, in a case where system information is to be transmitted to the remote terminal 230, the relay terminal 210 transmits the broadcast message including the emergency warning information at timing different from the timing of transmitting the system information.

Figure 7:
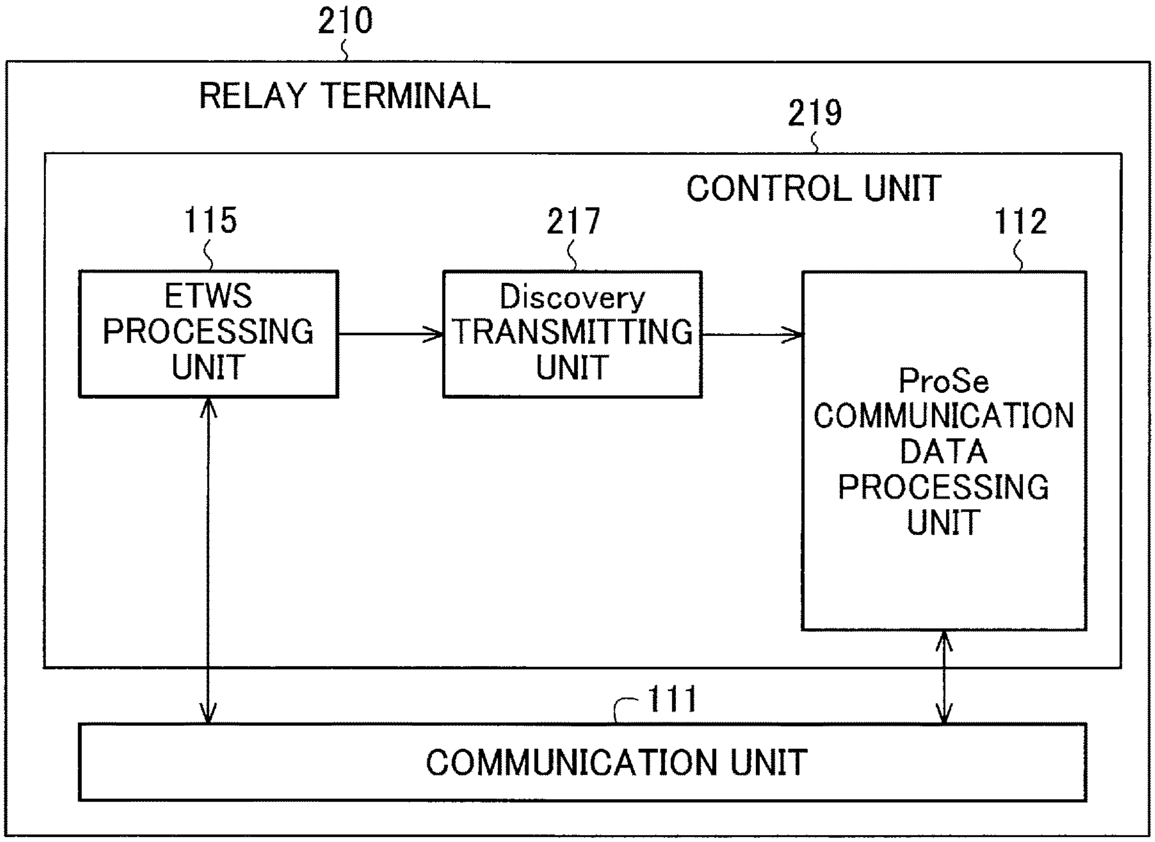
FIG. 7 is a block diagram schematically illustrating a configuration of a relay terminal in a second embodiment.

FIG. 7 is a block diagram schematically illustrating a configuration of the relay terminal 210 in the second embodiment.

The relay terminal 210 includes the communication unit 111, the ProSe communication data processing unit 112, the ETWS processing unit 115, and a Discovery transmitting unit 217.

The communication unit 111, ProSe communication data processing unit 112, and ETWS processing unit 115 of the relay terminal 210 in the second embodiment are substantially the same as the communication unit 111, ProSe communication data processing unit 112, and ETWS processing unit 115 of the relay terminal 110 in the first embodiment, respectively.

It is noted that when requested by the Discovery transmitting unit 217 to transmit a Discovery message, the ProSe communication data processing unit 112 of the second embodiment causes the communication unit 111 to transmit the Discovery message to the remote terminal 230. The ETWS processing unit 115 of the second embodiment passes the ETWS information received by the communication unit 111 to the Discovery transmitting unit 217.

The Discovery transmitting unit 217 transmits the Discovery messages via the ProSe communication data processing unit 112 and communication unit 111 at the timing of autonomous determination. For example, after receiving the ETWS information from the ETWS processing unit 115, the Discovery transmitting unit 217 generates a Discovery message including the ETWS information as the Discovery message to be first transmitted and requests the ProSe communication data processing unit 112 to transmit the Discovery message. However, in other cases, it generates a Discovery message not including the ETWS information, and requests the ProSe communication data processing unit 112 to transmit the Discovery message.

Here, the ProSe communication data processing unit 112, ETWS processing unit 115, and Discovery transmitting unit 217 are also referred to as a control unit 219.

When the control unit 219 receives the emergency warning information, if a remote terminal 230 capable of communicating with the relay terminal 210 with ProSe exists outside the area 102 where the radio waves from the base station 101 reach, the control unit 219 causes the communication unit 111 to transmit a broadcast message including the emergency warning information to the remote terminal 230 by using the PSSCH.

As illustrated in FIG. 4A, for example, some or all of the Discovery transmitting unit 217 described above can also be composed of the memory 10 and the processor 11, such as a CPU, that executes a program stored in the memory 10. Such a program may be provided through a network or may be recorded and provided on a recording medium. That is, such a program may be provided, for example, as a program product. In other words, the relay terminal 210 can be implemented by a computer.

As illustrating in FIG. 4B, for example, some or all of the Discovery transmitting unit 217 can also be composed of the processing circuit 12, such as a single circuit, a complex circuit, a processor operating on a program, a parallel processor operating on a program, or an ASIC or FPGA.

As described above, the Discovery transmitting unit 217 can be implemented by processing circuitry.

Figure 8:
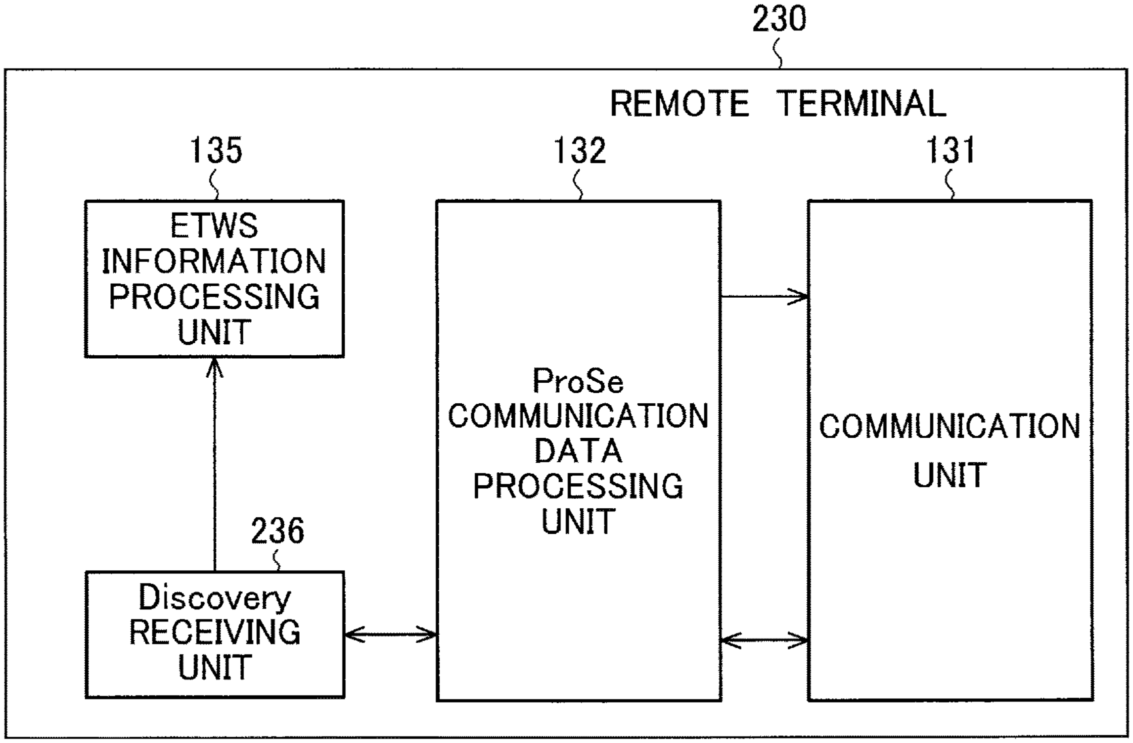
FIG. 8 is a block diagram schematically illustrating a configuration of a remote terminal in the second embodiment.

FIG. 8 is a block diagram schematically illustrating a configuration of the remote terminal 230 in the second embodiment.

The remote terminal 230 includes the communication unit 131, the ProSe communication data processing unit 132, the ETWS information processing unit 135, and a Discovery receiving unit 236.

The communication unit 131, ProSe communication data processing unit 132, and ETWS information processing unit 135 of the remote terminal 230 in the second embodiment are substantially the same as the communication unit 131, ProSe communication data processing unit 132, and ETWS information processing unit 135 of the remote terminal 130 in the first embodiment, respectively.

It is noted that the ProSe communication data processing unit 132 of the second embodiment passes the Discovery message received by the communication unit 131 to the Discovery receiving unit 236. The ETWS information processing unit 135 of the second embodiment processes the received ETWS information passed from the Discovery receiving unit 236 as the earthquake tsunami warning information.

The Discovery receiving unit 236 processes the Discovery messages passed from the ProSe communication data processing unit 132. For example, when the Discovery message includes ETWS information, the Discovery receiving unit 236 passes the ETWS information to the ETWS information processing unit 135.

As illustrated in FIG. 4A, for example, some or all of the Discovery receiving unit 236 described above can also be composed of the memory 10 and the processor 11, such as a CPU, that executes a program stored in the memory 10. Such a program may be provided through a network or may be recorded and provided on a recording medium. That is, such a program may be provided, for example, as a program product. In other words, the remote terminal 230 can be implemented by a computer.

As illustrating in FIG. 4B, for example, the Discovery receiving unit 236 can also be composed of the processing circuit 12, such as a single circuit, a complex circuit, a processor operating on a program, a parallel processor operating on a program, or an ASIC or FPGA.

As described above, the Discovery receiving unit 236 can be implemented by processing circuitry.

Figure 9:
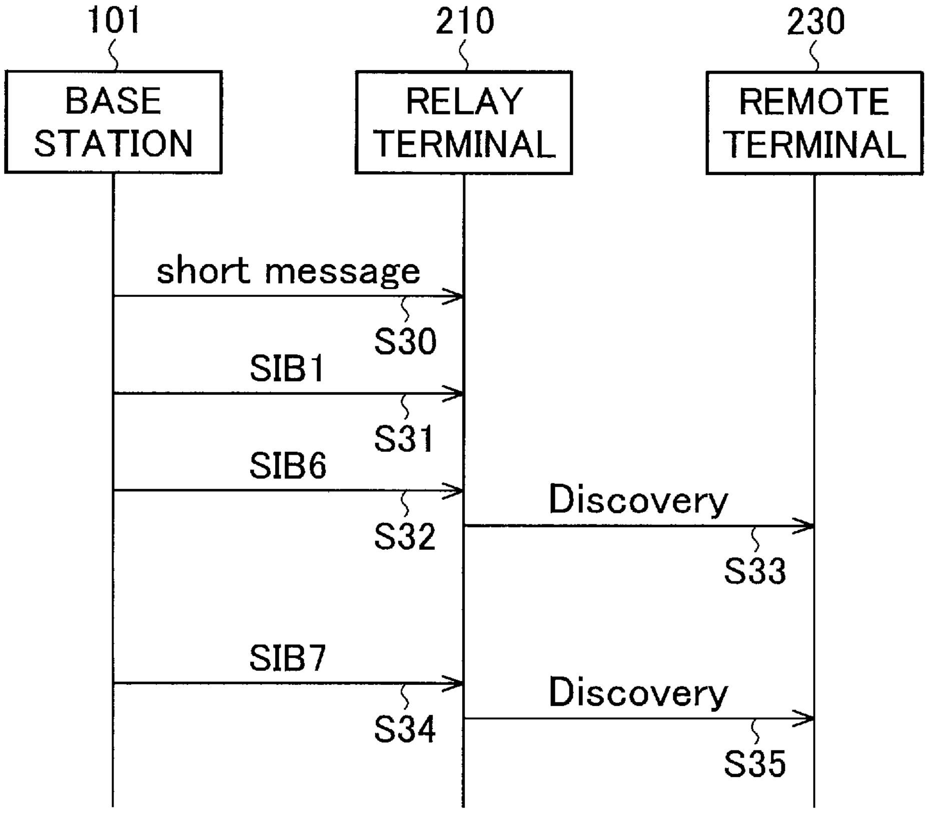
FIG. 9 is a sequence diagram illustrating a communication procedure of the ETWS information in the second embodiment.

FIG. 9 is a sequence diagram illustrating a communication procedure of the ETWS information in the second embodiment.

First, the base station 101 transmits a short message indicative of the existence of the ETWS information to the relay terminal 210, on the PDCCH (S30). Thus, the base station 101 notifies the relay terminal 210 of the existence of the ETWS information.

The relay terminal 210 that has received the short message indicative of the existence of the ETWS information receives the SIB1 transmitted on the BCCH in order to receive information indicative of the transmission timing of the ETWS information (S31).

Based on the transmission timing of the SIB6 on the BCCH that has been known in step S31, the relay terminal 210 receives the SIB6 on the BCCH (S32).

The relay terminal 210 transmits a Discovery message including the contents of the received SIB6 to the remote terminal 230 (S33).

For example, the ETWS processing unit 115 passes the contents of the SIB6 received in step S32 to the Discovery transmitting unit 217. The Discovery transmitting unit 217 transmits a Discovery message at the timing of autonomous determination. Here, after the contents of the SIB6 are passed to the Discovery transmitting unit 217, the Discovery transmitting unit 217 generates the Discovery message by including the contents of the SIB6 in the Discovery message to be first transmitted. The Discovery transmitting unit 217 then requests the ProSe communication data processing unit 112 to transmit the generated Discovery message. In cases other than the above, the Discovery transmitting unit 217 generates a Discovery message not containing the ETWS information and requests the ProSe communication data processing unit 112 to transmit the generated Discovery message. The ProSe communication data processing unit 112 then transmits the Discovery message to the Communication unit 111.

The remote terminal 230 then acquires the ETWS information from the contents of the SIB6 included in the received Discovery message. For example, the ProSe communication data processing unit 132 of the remote terminal 230 passes the Discovery message to the Discovery receiving unit 236 when the communication unit 131 receives the Discovery message. In a case where the passed Discovery message includes the SIB6, the Discovery receiving unit 236 passes the contents of the SIB6 to the ETWS information processing unit 135. The ETWS information processing unit 135 processes the contents of the passed SIB6 as the earthquake tsunami warning information.

Based on the transmission timing of the SIB7 on the BCCH that has been known in step S31, the relay terminal 210 receives the SIB7 on the BCCH (S34).

The relay terminal 210 transmits a Discovery message including the contents of the received SIB7 to the remote terminal 230 (S35).

For example, the ETWS processing unit 115 passes the contents of the SIB7 received in step S34 to the Discovery transmitting unit 217. After the contents of the SIB7 are passed to the Discovery transmitting unit 217, the Discovery transmitting unit 217 generates a Discovery message by including the contents of the SIB7 in the Discovery message to be first transmitted. The Discovery transmitting unit 217 then requests the ProSe communication data processing unit 112 to transmit the generated Discovery message. The ProSe communication data processing unit 112 then causes the communication unit 111 to transmit the Discovery message.

The remote terminal 230 then acquires the ETWS information from the contents of the SIB7 included in the received Discovery message. For example, the ProSe communication data processing unit 132 of the remote terminal 230 passes the Discovery message to the Discovery receiving unit 236 when the communication unit 131 receives the Discovery message. In a case where the passed Discovery message includes the SIB7, the Discovery receiving unit 236 passes the contents of the SIB7 to the ETWS information processing unit 135. The ETWS information processing unit 135 processes the contents of the SIB7 as the earthquake tsunami warning information.

As described above, the ETWS information can be transmitted to the remote terminal 230 even when the base station 101, relay terminal 210, and remote terminal 230 are not compatible with the UE-to-Network Relay system.

By combining the above second embodiment and the system described in Patent Reference 1 or system described in the reference mentioned in the above first embodiment, the relay terminal 210 can transmit the ETWS information to the remote terminal 230 using a plurality of communication methods.

In the second embodiment described above, the Discovery message is used, but any message other than the Discovery message may be used as long as it is a broadcast message that can be received by the remote terminal 230 where the connection for the one-to-one communication with the relay terminal 210 by using the PSSCH has not yet been established.

Third Embodiment

As illustrated in FIG. 1, a wireless communication system 300 according to a third embodiment includes a relay terminal 310 and a remote terminal 330.

In the third embodiment, in a case where the relay terminal 310 exists inside the area 102 where the radio waves from the base station 101 reach while the remote terminal 330 exists outside the area 102 where the radio waves from the base station 101 reach, when receiving the emergency warning information, which is information for the notification of an emergency situation, from the base station 101, the relay terminal 310 transmits the emergency warning information to the remote terminal 330 by using the connection that has been established between the relay terminal 310 and the remote terminal 330 for the one-to-one communication using the PSSCH, while transmitting a broadcast message including the emergency warning information to the remote terminal 330 by using the PSSCH.

Here, it is assumed that the relay terminal 310 establishes the connection with the remote terminal 330 before it receives the emergency warning information.

Further, here, in a case where system information is to be transmitted to the remote terminal 330, it is assumed that the relay terminal 310 establishes the connection with the remote terminal 330 at timing different from the timing of transmitting the system information to transmit the broadcast message including the emergency warning information.

Figure 10:
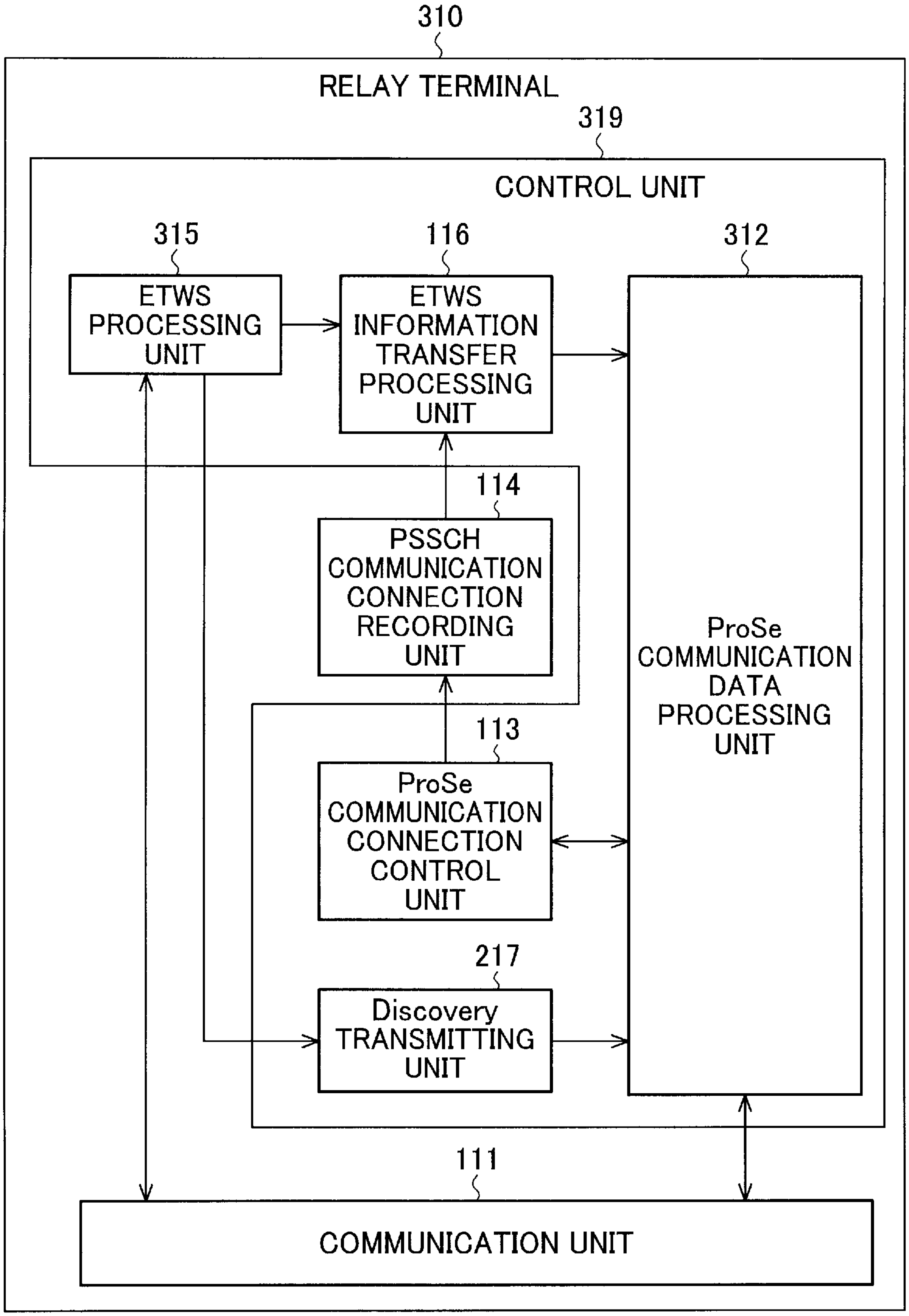
FIG. 10 is a block diagram schematically illustrating a configuration of a relay terminal in a third embodiment.

FIG. 10 is a block diagram schematically illustrating a configuration of the relay terminal 310 in the third embodiment.

The relay terminal 310 includes the communication unit 111, a ProSe communication data processing unit 312, the ProSe communication connection control unit 113, the PSSCH communication connection recording unit 114, an ETWS processing unit 315, an ETWS information transfer processing unit 116, and the Discovery transmitting unit 217.

The communication unit 111, ProSe communication connection control unit 113, PSSCH communication connection recording unit 114, and ETWS information transfer processing unit 116 of the relay terminal 310 in the third embodiment are substantially the same as the communication unit 111, ProSe communication connection control unit 113, PSSCH communication connection recording unit 114, and ETWS information transfer processing unit 116 of the relay terminal 110 in the first embodiment, respectively.

The Discovery transmitting unit 217 of the relay terminal 310 in the third embodiment is substantially the same as the Discovery transmitting unit 217 of the relay terminal 210 in the second embodiment.

The ProSe communication data processing unit 312 processes a communication protocol for transmitting messages with the data plane and the control plane on the communication channel used by the ProSe. The ProSe communication data processing unit 312 passes, to the ProSe communication connection control unit 113, a necessary piece(s) (e.g., a control plane message) of the data received by the communication unit 111 on the communication channel used by the ProSe.

When requested by the Discovery transmitting unit 217 to transmit a Discovery message, the ProSe communication data processing unit 312 causes the communication unit 111 to transmit the Discovery message to the remote terminal 330.

The ETWS processing unit 315 passes the ETWS information received by the communication unit 111 to the ETWS information transfer processing unit 116 and the Discovery transmitting unit 217.

Here, the ProSe communication data processing unit 312, ProSe communication connection control unit 113, ETWS processing unit 315, ETWS information transfer processing unit 116, and Discovery transmitting unit 217 are also referred to as a control unit 319.

In a case where the remote terminal 330 capable of communicating with the relay terminal 310 by using the ProSe exists outside the area 102 where the radio waves from the base station 101 reach when receiving the emergency warning information, the control unit 319 causes the communication unit 111 to transmit the emergency warning information to the remote terminal 330 by using the connection that has been established between the relay terminal 310 and the remote terminal 330 for the one-to-one communication using the PSSCH, while causing the communication unit 111 to transmit the broadcast message including the emergency warning information to the remote terminal 330 by using the PSSCH.

Figure 11:
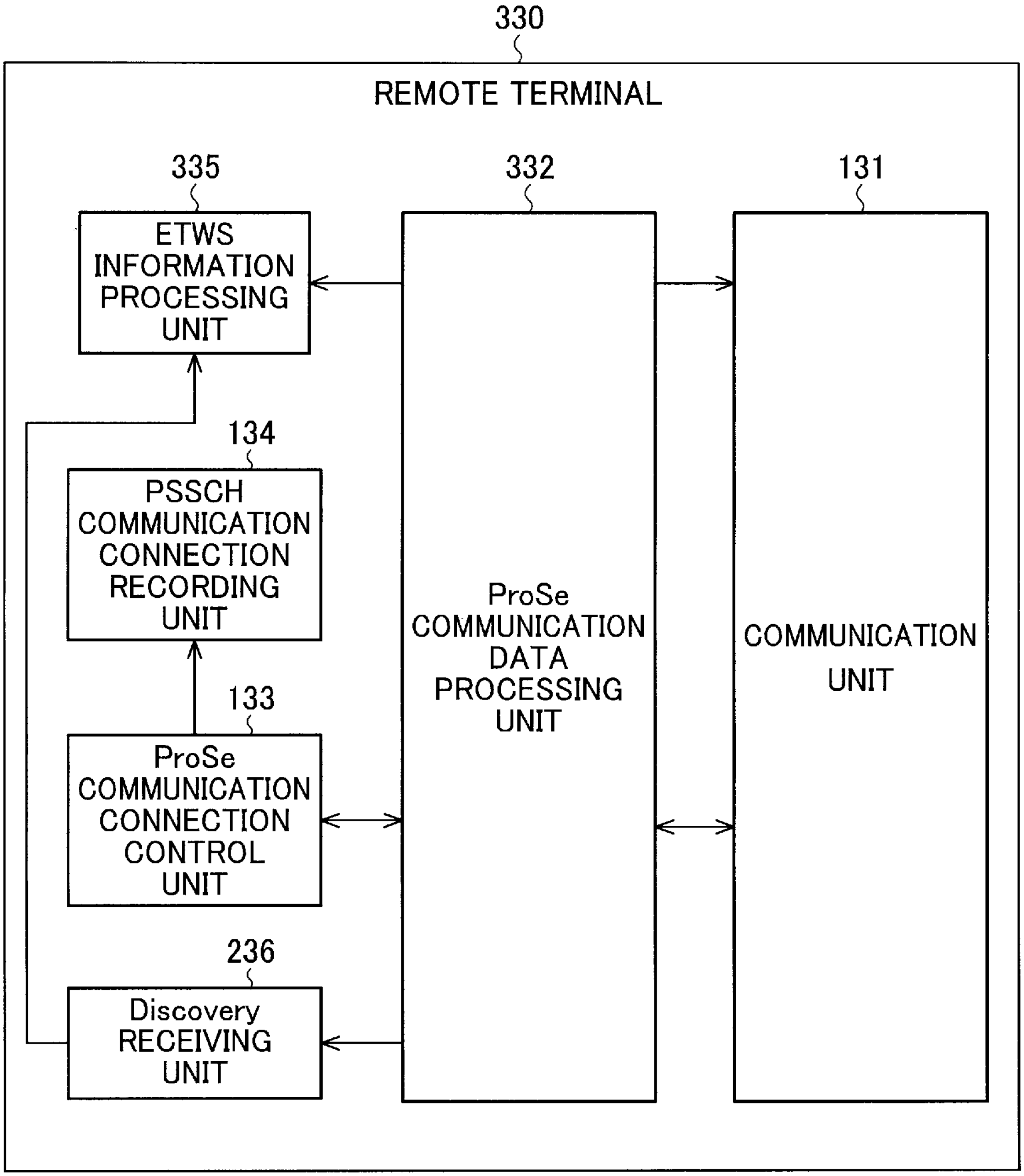
FIG. 11 is a block diagram schematically illustrating a configuration of a remote terminal in the third embodiment.

FIG. 11 is a block diagram schematically illustrating a configuration of the remote terminal 330 in the third embodiment.

The remote terminal 330 includes the communication unit 131, a ProSe communication data processing unit 332, the ProSe communication connection control unit 133, the PSSCH communication connection recording unit 134, an ETWS information processing unit 335, and the Discovery receiving unit 236.

The communication unit 131, ProSe communication connection control unit 133, and PSSCH communication connection recording unit 134 of the remote terminal 330 in the third embodiment are substantially the same as the communication unit 131, ProSe communication connection control unit 133, and PSSCH communication connection recording unit 134 of the remote terminal 130 in the first embodiment, respectively.

The Discovery receiving unit 236 of the remote terminal 330 in the third embodiment is substantially the same as the Discovery receiving unit 236 of the remote terminal 230 in the second embodiment.

The ProSe communication data processing unit 332 processes a communication protocol for transmitting messages with the data plane and the control plane on the communication channel used by the ProSe. For example, the ProSe communication data processing unit 332 passes an ETWS notification message received on the PSSCH, to the ETWS information processing unit 335, and also passes a necessary piece (s) (e.g., a control plane message) of the data received on the communication channel used by the ProSe, to the ProSe communication connection control unit 133.

In addition, the ProSe communication data processing unit 332 also passes the Discovery message received by the communication unit 131 to the Discovery receiving unit 236.

The ETWS information processing unit 335 processes the ETWS notification message received from the ProSe communication data processing unit 332. For example, the ETWS information processing unit 335 processes the ETWS information included in the received ETWS notification message as the earthquake tsunami warning information.

The ETWS information processing unit 335 processes the ETWS information passed from the Discovery receiving unit 236 as the earthquake tsunami warning information.

Figure 12:
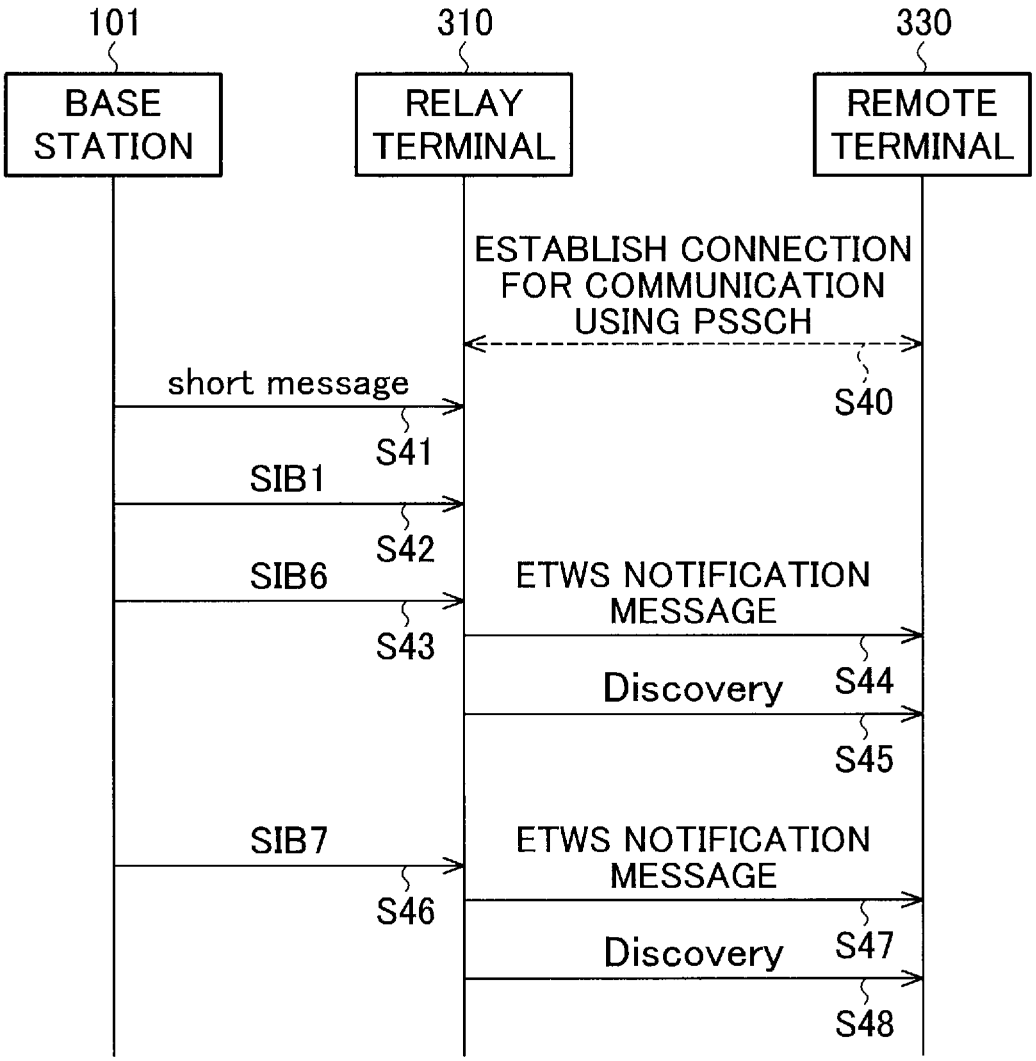
FIG. 12 is a sequence diagram illustrating a communication procedure of the ETWS information in the third embodiment.

FIG. 12 is a sequence diagram illustrating a communication procedure of the ETWS information in the third embodiment.

First, according to some trigger, the remote terminal 330 and the relay terminal 310 establish a connection to achieve the one-to-one communication between them by using the PSSCH (S40).

Next, the base station 101 transmits a short message indicative of the existence of the ETWS information to the relay terminal 310, on the PDCCH (S41). Thus, the base station 101 notifies the relay terminal 310 of the existence of the ETWS information.

The relay terminal 310 that has received the short message indicative of the existence of the ETWS information receives the SIB1 transmitted on the BCCH in order to receive information indicative of the transmission timing of the ETWS information (S42).

Based on the transmission timing of the SIB6 on the BCCH that has been known in step S22, the relay terminal 310 receives the SIB6 on the BCCH (S43).

The relay terminal 310 transmits an ETWS notification message including the contents of the received SIB6 to the remote terminal 330 by utilizing the connection for the one-to-one communication using the PSSCH (S44).

For example, the ETWS processing unit 315 passes the contents of the SIB6 received in step S43 to the ETWS information transfer processing unit 116. The ETWS information transfer processing unit 116 generates an ETWS notification message including the contents of the passed SIB6. By utilizing the connection for the one-to-one communication using the PSSCH, the ETWS information transfer processing unit 116 causes the ProSe communication data processing unit 312 and the communication unit 111 to transmit the ETWS notification message to the remote terminal 330 where the connection for the one-to-one communication using the PSSCH has already been established in step S40. Specifically, the ETWS information transfer processing unit 116 reads information on the connected remote terminal 330, which has been recorded in the PSSCH communication connection recording unit 114, passes the ETWS notification message to the ProSe communication data processing unit 312, and requests the ProSe communication data processing unit 312 to transmit the ETES notification message to the remote terminal 330 on the PSSCH.

The remote terminal 330 then acquires the ETWS information from the contents of the SIB6 included in the received ETWS notification message. Specifically, the ETWS information processing unit 335 processes the contents of the SIB6 included in the received ETWS notification message as the earthquake tsunami warning information.

The relay terminal 310 transmits a Discovery message including the contents of the received SIB6 to the remote terminal 330 (S45).

For example, the ETWS processing unit 315 passes the contents of the SIB6 received in step S43 to the Discovery transmitting unit 217. After the contents of the SIB6 are passed to the Discovery transmitting unit 217, the Discovery transmitting unit 217 generates a Discovery message by including the contents of the SIB6 in the Discovery message to be first transmitted. The Discovery transmitting unit 217 then requests the ProSe communication data processing unit 312 to transmit the generated Discovery message. The ProSe communication data processing unit 312 causes the communication unit 111 to transmit the Discovery message to.

The remote terminal 330 then acquires the ETWS information from the contents of the SIB6 included in the received Discovery message. For example, the ProSe communication data processing unit 332 of the remote terminal 330 passes the Discovery message to the Discovery receiving unit 236 when the communication unit 131 receives the Discovery message. In a case where the passed Discovery message includes the SIB6, the Discovery receiving unit 236 passes the contents of the SIB6 to the ETWS information processing unit 335. The ETWS information processing unit 335 processes the contents of the passed SIB6 as the earthquake tsunami warning information.

Based on the transmission timing of the SIB7 on the BCCH that has been known in step S42, the relay terminal 310 receives the SIB7 on the BCCH (S46). For example, at the transmission timing of the SIB7 on the BCCH that has been known in step S42, the ETWS processing unit 315 causes the communication unit 111 to receive the SIB7 on the BCCH to obtain the SIB7.

The relay terminal 310 transmits the ETWS notification message including the contents of the received SIB7 to the remote terminal 330 by utilizing the connection for the one-to-one communication using the PSSCH (S47). The processing contents here are substantially the same as those performed when the contents of the SIB6 are received.

The remote terminal 330 then acquires the ETWS information from the contents of the SIB7 included in the received ETWS notification message. Specifically, the ETWS information processing unit 135 processes the contents of the SIB7 included in the received ETWS notification message as the earthquake tsunami warning information.

The relay terminal 310 transmits a Discovery message including the contents of the received SIB7 to the remote terminal 330 (S48). The processing contents here are substantially the same as those performed when the contents of the SIB6 are received.

The remote terminal 330 then acquires the ETWS information from the contents of the SIB7 included in the received Discovery message.

As described above, the ETWS information can be transmitted to the remote terminal 330 even when the base station 101, relay terminal 310, and remote terminal 330 are not compatible with the UE-to-Network Relay system.

Furthermore, as described above, the relay terminal 310 can transmit the ETWS information to the remote terminal 330 using a plurality of communication methods.

Fourth Embodiment

As illustrated in FIG. 1, a wireless communication system 400 according to a fourth embodiment includes a relay terminal 410 and the remote terminal 230.

The remote terminal 230 in the wireless communication system 400 according to the fourth embodiment is substantially the same as the remote terminal 230 in the wireless communication system 200 according to the second embodiment.

In the fourth embodiment, when receiving emergency warning information, the relay terminal 410 sets a deadline for transmitting the emergency warning information and transmits a broadcast message including the emergency warning information to the remote terminal 230 a plurality of times before the deadline.

Figures 13, 14:
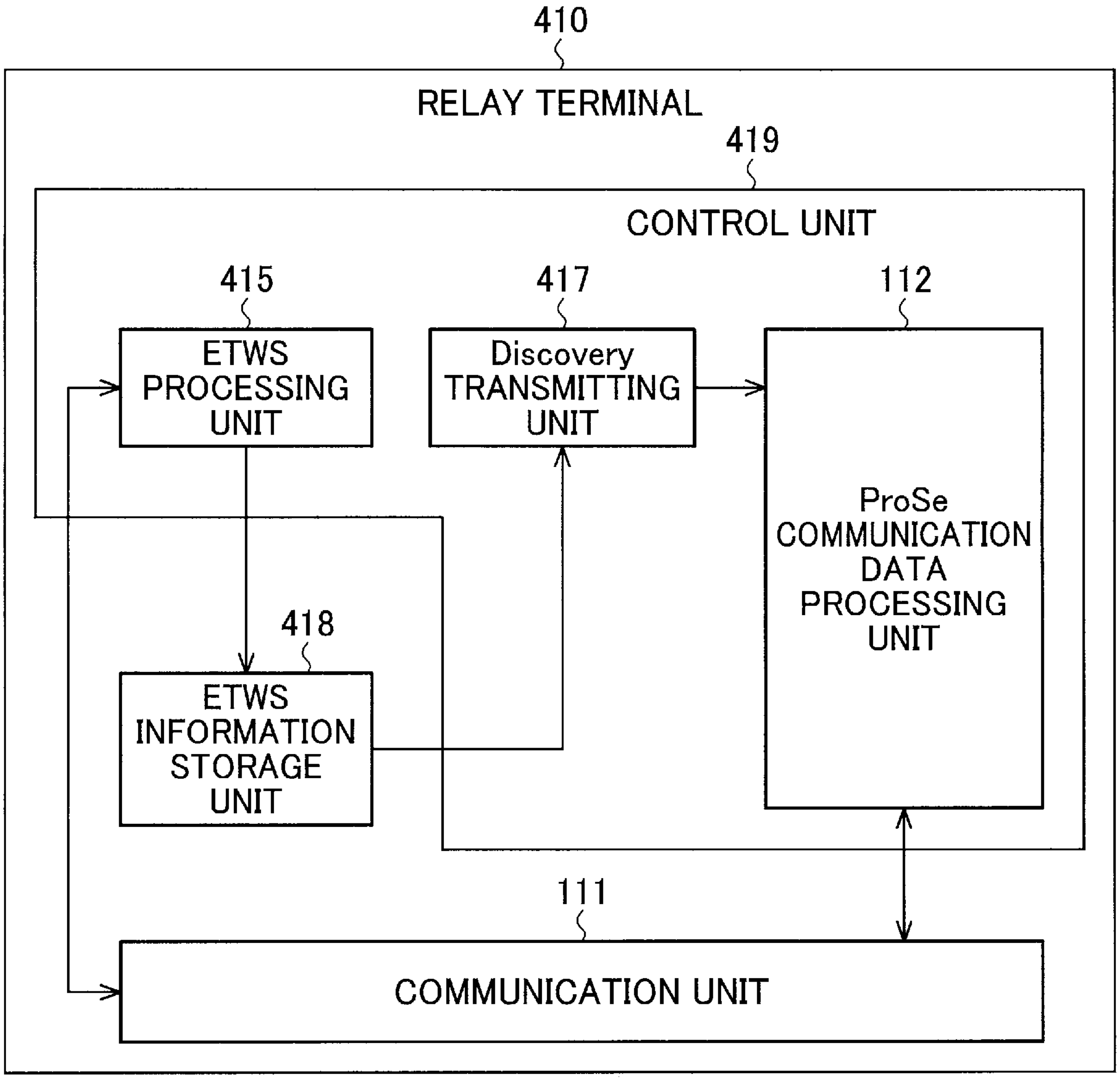
FIG. 13 is a block diagram schematically illustrating a configuration of a relay terminal in a fourth embodiment.
FIG. 14 is a schematic diagram illustrating an example of the ETWS information and a transmission end time.

FIG. 13 is a block diagram schematically illustrating a configuration of the relay terminal 410 in the fourth embodiment.

The relay terminal 410 includes the communication unit 111, the ProSe communication data processing unit 112, an ETWS processing unit 415, a Discovery transmitting unit 417, and an ETWS information storage unit 418.

The communication unit 111 and ProSe communication data processing unit 112 of the relay terminal 410 in the fourth embodiment are substantially the same as the communication unit 111 and ProSe communication data processing unit 112 of the relay terminal 110 in the first embodiment, respectively.

It is noted that when requested by the Discovery transmitting unit 417 to transmit a Discovery message, the ProSe communication data processing unit 112 of the fourth embodiment causes the communication unit 111 to transmit the Discovery message to the remote terminal 230.

The ETWS processing unit 415 obtains the ETWS information received by the communication unit 111 and determines the transmission end time, which is the time to end the transmission of the ETWS information. The ETWS processing unit 415 then associates the ETWS information with the transmission end time and stores them in the ETWS information storage unit 418. The transmission end time is the deadline for transmitting the ETES information.

The ETWS information storage unit 418 then associates the ETWS information given thereto from the ETWS processing unit 415 with the transmission end time and stores them therein.

FIG. 14 is a schematic diagram illustrating an example of the ETWS information and transmission end time which are stored in the ETWS information storage unit 418.

Returning to FIG. 13, the Discovery transmitting unit 417 transmits the Discovery message via the ProSe communication data processing unit 112 and communication unit 111 at the timing of autonomous determination. Here, in a case where the transmission end time has not yet elapsed upon the transmission of the Discovery message, in other words, in a case where the ETWS information storage unit 418 stores ETWS information whose transmission end time is later than the current time, the Discovery transmitting unit 417 generates a Discovery message including such ETWS information. It is noted that in a case where the ETWS information storage unit 418 does not store such ETWS information, the Discovery transmitting unit 417 generates a Discovery message not including the ETWS information. The Discovery transmitting unit 417 then requests the ProSe communication data processing unit 112 to transmit the generated Discovery message.

Here, the ProSe communication data processing unit 112, ETWS processing unit 415, and Discovery transmitting unit 417 are also referred to as a control unit 419.

When the communication unit 111 receives the emergency warning information, the control unit 419 sets a deadline for transmitting the emergency warning information and causes the communication unit 111 to transmit a broadcast message including the emergency warning information to the remote terminal 230 a plurality of times before the deadline.

The ETWS information storage unit 418 described above can be implemented by a volatile or non-volatile memory.

The sequence illustrating the communication procedure of the ETWS information in the fourth embodiment is almost the same as the sequence illustrating the communication procedure of the ETWS information in the second embodiment illustrated in FIG. 9.

However, in step S32 of FIG. 9, when the communication unit 111 receives an SIB6 on the BCCH, the ETWS processing unit 415 receives the contents of the SIB6 and causes the ETWS information storage unit 418 to store its contents as the ETWS information. The ETWS processing unit 415 then determines the transmission end time of the ETWS information, associates the transmission end time with the ETWS information, and stores them in the ETWS information storage unit 418. The transmission end time can be set, for example, by adding a predetermined time to the current time. It is noted that the transmission end time may be determined in other ways, such as by using a timer provided and notified in the base station 101.

In step S33, when the transmission end time stored in the ETWS information storage unit 418 is confirmed upon transmission of the Discovery message which is performed autonomously and there is any ETWS information whose transmission end time is later than the current time, the Discovery transmitting unit 417 generates the Discovery message including the ETWS information. When there is no such ETWS information, the Discovery transmitting unit 417 generates a Discovery message not including the ETWS information and requests the ProSe communication data processing unit 112 to transmit the generated Discovery message. The ProSe communication data processing unit 112 then transmits the Discovery message in response to such a request.

It is noted that the same processing as described above is also performed on the SIB7 in steps S34 and S35 illustrated in FIG. 9.

As described above, the relay terminal 410 can transmit the ETWS information to the remote terminal 430 in the Discovery message for a certain period of time after the relay terminal 410 receives the ETWS information. This can increase the possibility of the remote terminal 430 receiving the ETWS information.

Fifth Embodiment

As illustrated in FIG. 1, a wireless communication system 500 according to a fifth embodiment includes a relay terminal 510 and the remote terminal 130.

The remote terminal 130 in the wireless communication system 500 according to the fifth embodiment is substantially the same as the remote terminal 130 in the wireless communication system 100 according to the first embodiment.

In the fifth embodiment, when receiving emergency warning information, the relay terminal 510 sets a deadline for transmitting the emergency warning information and transmits the emergency warning information to the remote terminal 130 a plurality of times before the deadline.

Figure 15:
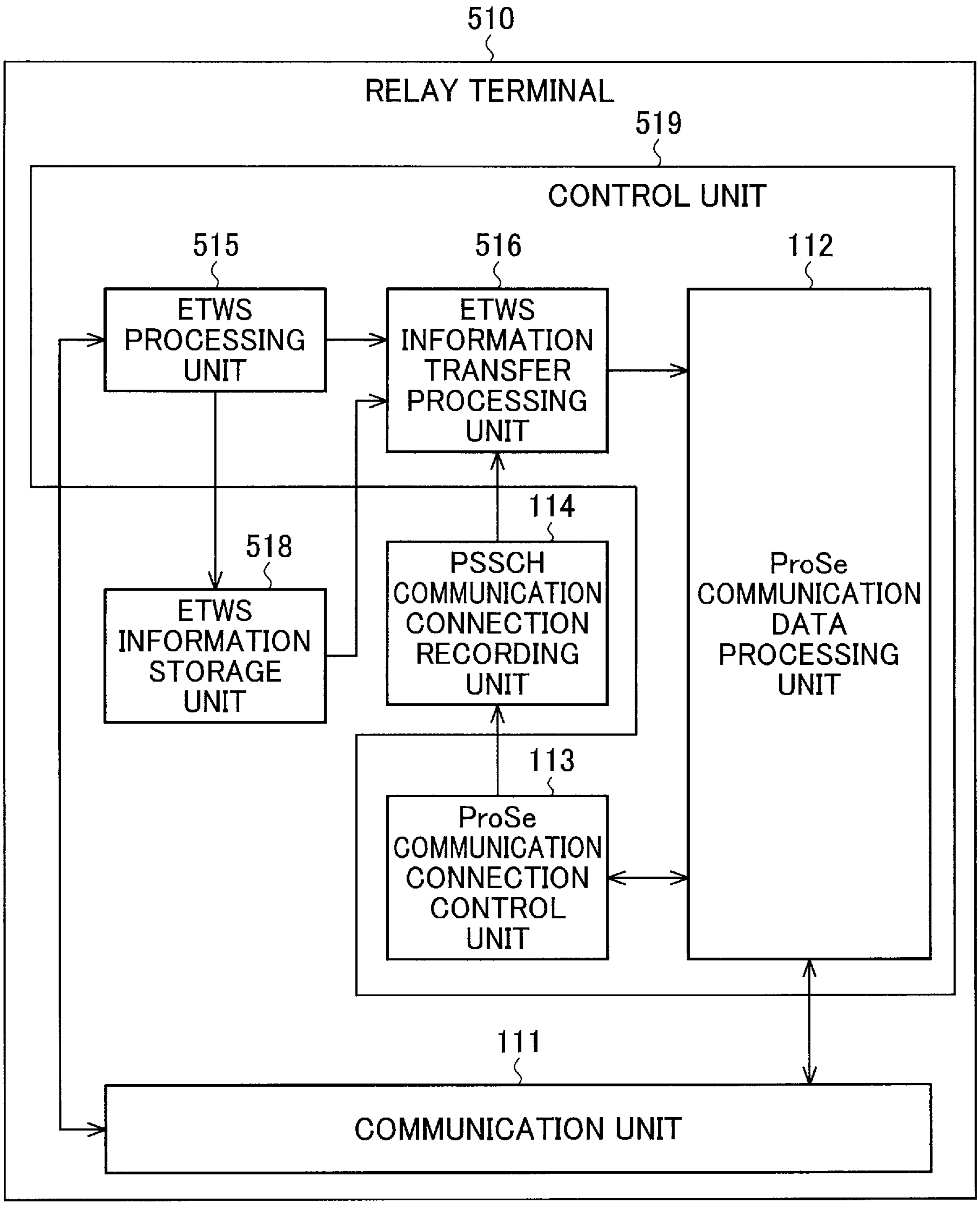
FIG. 15 is a block diagram schematically illustrating a configuration of a relay terminal in a fifth embodiment.

FIG. 15 is a block diagram schematically illustrating a configuration of the relay terminal 510 in the fifth embodiment.

The relay terminal 510 includes the communication unit 111, the ProSe communication data processing unit 112, the ProSe communication connection control unit 113, the PSSCH communication connection recording unit 114, an ETWS processing unit 515, an ETWS information transfer processing unit 516, and an ETWS information storage unit 518.

The communication unit 111, ProSe communication data processing unit 112, ProSe communication connection control unit 113, and PSSCH communication connection recording unit 114 of the relay terminal 510 in the fifth embodiment are substantially the same as the communication unit 111, ProSe communication data processing unit 112, ProSe communication connection control unit 113, and PSSCH communication connection recording unit 114 of the relay terminal 110 in the first embodiment, respectively.

The ETWS processing unit 515 receives the ETWS information received by the communication unit 111 and determines the transmission end time, which is the time to end the transmission of the ETWS information. The ETWS processing unit 515 then gives the ETWS information to the ETWS information transfer processing unit 516, associates the ETWS information with its transmission end time, and stores them in the ETWS information storage unit 518.

The ETWS information storage unit 518 then associates the ETWS information given thereto from the ETWS processing unit 515 with the transmission end time and stores them therein. The information stored here is substantially the same as that in the fourth embodiment as illustrated in FIG. 14, for example.

Upon receiving the ETWS information from the ETWS processing unit 515 or at the timing of independent judgment, the ETWS information transfer processing unit 516 requires the Prose communication data processing unit 112 to transmit, on the PSSCH, an ETWS communication message including the ETWS information to the remote terminal 130 where the connection for the one-to-one communication using the PSSCH has been established, based on the information recorded in the PSSCH communication connection recording unit 114.

The ProSe communication data processing unit 112, ProSe communication connection control unit 113, ETWS processing unit 515, and ETWS information transfer processing unit 516 are also referred to as a control unit 519.

When the communication unit 111 receives emergency warning information, the control unit 519 sets a deadline for transmitting the emergency warning information and causes the communication unit 111 to transmit the emergency warning information to the remote terminal 130 a plurality of times before the deadline.

The sequence illustrating the communication procedure of the ETWS information in the fifth embodiment is almost the same as the sequence illustrating the communication procedure of the ETWS information in the first embodiment illustrated in FIG. 6.

However, in step S23 of FIG. 6, when the communication unit 111 receives an SIB6 on the BCCH, the ETWS processing unit 515 receives the contents of the SIB6 and causes the ETWS information storage unit 518 to store its contents as the ETWS information. The ETWS processing unit 515 then determines the transmission end time of the ETWS information, associates the transmission end time with the ETWS information, and stores them in the ETWS information storage unit 518. The transmission end time may be determined in the same way as in the fourth embodiment.

The ETWS processing unit 515 passes the contents of the SIB6 received in step S23 to the ETWS information transfer processing unit 516. The ETWS information transfer processing unit 516 generates an ETWS notification message including the contents of the passed SIB6. By utilizing the connection for the one-to-one communication using the PSSCH, the ETWS information transfer processing unit 516 causes the ProSe communication data processing unit 112 and the communication unit 111 to transmit the ETWS notification message to the remote terminal 130 where the connection for the one-to-one communication using the PSSCH has already been established in step S20. The processing here is substantially the same as in the first embodiment.

The ETWS information transfer processing unit 516 confirms the transmission end time stored in the ETWS information storage unit 518 at the timing of autonomous determination. If there is any ETWS information whose transmission end time is later than the current time, the ETWS information transfer processing unit 516 generates an ETWS notification message including the ETWS information. By utilizing the connection for the one-to-one communication using the PSSCH, the ETWS information transfer processing unit 516 causes the ProSe communication data processing unit 112 and the communication unit 111 to transmit the ETWS notification message to the remote terminal 130 where the connection for the one-to-one communication using the PSSCH has already been established in step S20. If there is no such ETWS information at the independent timing, the ETWS processing unit 515 will not have the ETWS notification message transmitted.

It is noted that the same processing as described above is performed on the SIB7 also in steps S25 and S26 illustrated in FIG. 6.

As described above, the relay terminal 510 can transmit the ETWS information to the remote terminal 130 in the ETWS notification message for a certain period of time after receiving the ETWS information. This can increase the possibility of the remote terminal 130 receiving the ETWS information.

Sixth Embodiment

As illustrated in FIG. 1, a wireless communication system 600 according to a sixth embodiment includes a relay terminal 610 and the remote terminal 130.

The remote terminal 130 in the wireless communication system 600 according to the sixth embodiment is substantially the same as the remote terminal 130 in the wireless communication system 100 according to the first embodiment.

In the sixth embodiment, when receiving emergency warning information, the relay terminal 610 sets a deadline for transmitting the emergency warning information and transmits the emergency warning information to the remote terminal 130 a plurality of times before the deadline.

In the sixth embodiment, in a case where the connection with the remote terminal 130 has not been established when receiving the emergency warning information, the relay terminal 610 re-establishes the connection with the remote terminal 130 and transmits the emergency warning information to the remote terminal 130.

Figure 16:
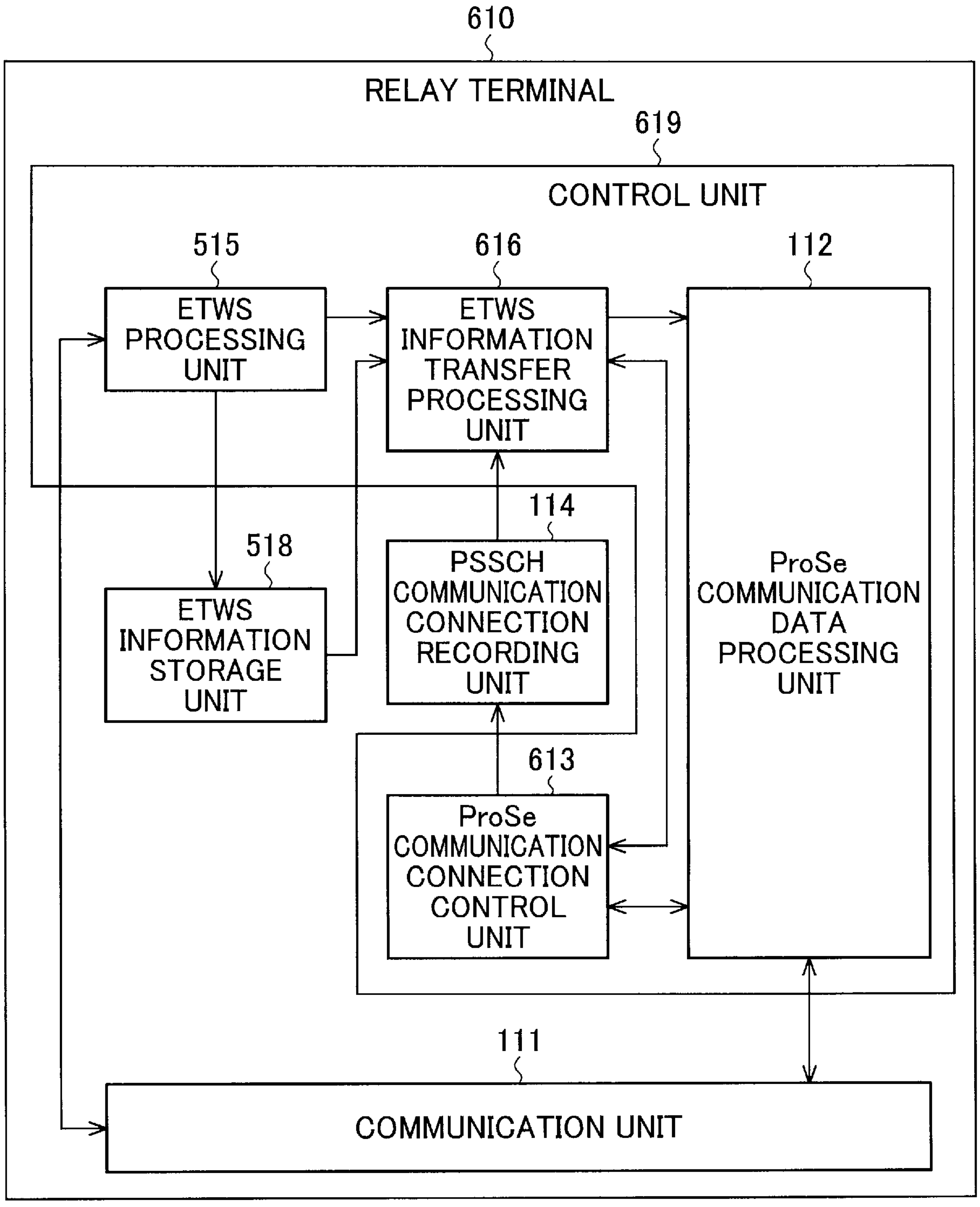
FIG. 16 is a block diagram schematically illustrating a configuration of a relay terminal in a sixth embodiment.

FIG. 16 is a block diagram schematically illustrating a configuration of the relay terminal 610 in the sixth embodiment.

The relay terminal 610 includes the communication unit 111, the ProSe communication data processing unit 112, a ProSe communication connection control unit 613, the PSSCH communication connection recording unit 114, the ETWS processing unit 515, an ETWS information transfer processing unit 616, and the ETWS information storage unit 518.

The communication unit 111, ProSe communication data processing unit 112, and PSSCH communication connection recording unit 114 of the relay terminal 610 in the sixth embodiment are substantially the same as the communication unit 111, ProSe communication data processing unit 112, and PSSCH communication connection recording unit 114 of the relay terminal 110 in the first embodiment, respectively.

The ETWS processing unit 515 and ETWS information storage unit 518 of the relay terminal 610 in the sixth embodiment are substantially the same as the ETWS processing unit 515 and ETWS information storage unit 518 of the relay terminal 510 in the fifth embodiment, respectively.

The ProSe Communication Connection Control Unit 613 processes communication messages of the control plane for establishing, releasing, etc., of the connection; the messages are necessary for the communication on the communication channel used by the ProSe. In the sixth embodiment, the ProSe communication connection control unit 613 establishes the connection for the one-to-one communication with the remote terminal 130 by using the PSSCH in response to the request from the ETWS information transfer processing unit 616.

Upon receiving the ETWS information from the ETWS processing unit 515 or at the timing of independent judgment, the ETWS information transfer processing unit 616 requires the Prose communication data processing unit 112 to transmit, on the PSSCH, an ETWS communication message including the ETWS information to the remote terminal 130 where the connection for the one-to-one communication by using the PSSCH has been established, based on the information recorded in the PSSCH communication connection recording unit 114.

In the sixth embodiment, in a case where the connection for the one-to-one communication with the remote terminal 130 using the PSSCH has not yet been established when transmitting the ETWS notification message, the ETWS information transfer processing unit 616 requests the ProSe communication connection control unit 613 to establish the connection for the one-to-one communication with the remote terminal 130 by using the PSSCH. Whether the connection for the one-to-one communication with the remote terminal 130 by using the PSSCH is established or not can be determined by confirming the information recorded in the PSSCH communication connection recording unit 114.

Here, the ProSe communication data processing unit 112, ProSe communication connection control unit 613, ETWS processing unit 515 and ETWS information transfer processing unit 616 are also referred to as a control unit 619.

When the communication unit 111 receives emergency warning information, the control unit 619 sets a deadline for transmitting the emergency warning information and causes the communication unit 111 to transmit the emergency warning information to the remote terminal 130 a plurality of times before the deadline.

In a case where the connection with the remote terminal 130 has not been established when the communication unit 111 receives the emergency warning information, the control unit 619 re-establishes the connection with the remote terminal 130 and causes the communication unit 111 to transmit the emergency warning information to the remote terminal 130.

As described above, for a certain period of time after the relay terminal 610 receives the ETWS information, the relay terminal 610 can newly establish a connection for the one-to-one communication using the PSSCH with the remote terminal 130 where the connection for the one-to-one communication using the PSSCH has not yet been established, and then the relay terminal 610 can also transmit the ETWS information to the remote terminal 130 where the new connection is established. This can increase the possibility of the remote terminal 130 receiving the ETWS information.

In the first or third embodiment, even in a case where the connection with the remote terminal 130 or 330 has not yet been established when the relay terminal 110 or 310 receives the emergency warning information, the ETWS information transfer processing unit 116 may instruct the ProSe communication connection control unit 113 to establish the connection with the remote terminal 130 or 330.

In the above description, the ETWS information, which is an example of emergency warning information transmitted using the PWS, is used, but the first to sixth embodiments can also be applied to other emergency warning information that can be transmitted using the PWS, such as that for a Commercial Mobile Alert System (CMAS), a Korean Public Alert System (KPAS), or EU-Alert.

DESCRIPTION OF REFERENCE CHARACTERS

100, 200, 300, 400, 500, 600 Wireless communication system
101 Base station
110, 210, 310, 410, 510, 610 Relay terminal
111 Communication unit
112, 312 ProSe communication data processing unit
113, 613 ProSe communication connection control unit
114 PSSCH communication connection recording unit
115, 315, 415, 515 ETWS processing unit
116, 516, 616 ETWS information transfer processing unit
217, 417 Discovery transmitting unit
418, 518 ETWS information storage unit
119, 219, 319, 419, 519, 619 Control unit
130, 230, 330 Remote terminal
131 Communication unit
132, 332 ProSe communication data processing unit
133 ProSe communication connection control unit

134 PSSCH communication connection recording unit
135, 335 ETWS information processing unit
236 Discovery receiving unit

What is claimed is:

1. A communication system that conducts Side Link Relay communication of Fifth Generation New Radio (5G NR) specified by a Third Generation Partnership Project (3GPP), comprising:

a base station;

a first mobile terminal; and a second mobile terminal capable of communicating with the first mobile terminal by using Proximity-based Services (ProSe), wherein, in a case where the first mobile terminal exists inside an area where radio waves from the base station reach while the second mobile terminal exists outside the area where the radio waves from the base station reach, when the first mobile terminal receives emergency warning information from the base station, the first mobile terminal sets a deadline for transmitting the emergency warning information and transmits the emergency warning information to the second mobile terminal a plurality of times before the deadline by using a connection that has been established between the first mobile terminal and the second mobile terminal for one-to-one communication using a Physical Sidelink Shared CHannel (PSSCH), the emergency warning information being information for notification of an emergency situation.

2. The communication system according to claim 1, wherein the first mobile terminal establishes the connection before receiving the emergency warning information or after receiving the emergency warning information.

3. The communication system according to claim 1, wherein the first mobile terminal establishes the connection at timing different from timing of transmitting system information to the second mobile terminal.

4. The communication system according to claim 1, wherein, when the connection has not yet been established at the timing of transmitting the emergency warning information to the second mobile terminal, the first mobile terminal re-establishes a connection for the one-to-one communication with the second mobile terminal by using the PSSCH.

5. A communication system that conducts Side Link Relay communication of Fifth Generation New Radio (5G NR) specified by a Third Generation Partnership Project (3GPP), comprising:

a base station;

a first mobile terminal; and a second mobile terminal capable of communicating with the first mobile terminal by using Proximity-based Services (ProSe), wherein, in a case where the first mobile terminal exists inside an area where radio waves from the base station reach while the second mobile terminal exists outside the area where the radio waves from the base station reach, when the first mobile terminal receives emergency warning information from the base station, the first mobile terminal sets a deadline for transmitting the emergency warning information and transmits a broadcast message including the emergency warning information to the second mobile terminal a plurality of times before the deadline by using a Physical Sidelink Shared CHannel (PSSCH), the emergency warning information being information for notification of an emergency situation.

6. The communication system according to claim 5, wherein the first mobile terminal transmits the broadcast message at timing different from timing of transmitting system information to the second mobile terminal.

7. A mobile terminal that conducts Side Link Relay communication of Fifth Generation New Radio (5G NR) specified by a Third Generation Partnership Project (3GPP), comprising:

a communication interface to receive emergency warning information from a base station, the emergency warning information being information for notification of an emergency situation; and processing circuitry to set deadline for transmitting the emergency warning information when the communication interface receives the emergency warning information and to cause the communication interface to transmit the emergency warning information to another mobile terminal a plurality of times before the deadline by using a connection that has been established between the mobile terminal and the another mobile terminal for one-to-one communication using a Physical Sidelink Shared CHannel (PSSCH) in a case where the another mobile terminal capable of communicating with the mobile terminal by using Proximity-based Services (ProSe) exists outside an area where radio waves from the base station reach when the communication interface receives the emergency warning information.

8. A mobile terminal that conducts Side Link Relay communication of Fifth Generation New Radio (5G NR) specified by a Third Generation Partnership Project (3GPP), comprising:

a communication interface to receive emergency warning information from a base station, the emergency warning information being information for notification of an emergency situation; and processing circuitry to set deadline for transmitting the emergency warning information when the communication interface receives the emergency warning information and to cause the communication interface to transmit a broadcast message including the emergency warning information to another mobile terminal a plurality of times before the deadline by using a Physical Sidelink Shared CHannel (PSSCH) in a case where the another mobile terminal capable of communicating with the mobile terminal by using Proximity-based Services (ProSe) exists outside an area where radio waves from the base station reach when the communication interface receives the emergency warning information.

9. A non-transitory computer-readable storage medium storing a program that causes a computer serving as a mobile terminal for conducting Side Link Relay communication of Fifth Generation New Radio (5G NR) specified by a Third Generation Partnership Project (3GPP) to execute processes comprising:

receiving emergency warning information from a base station, the emergency warning information being information for notification of an emergency situation;

setting a deadline for transmitting the emergency warning information when the emergency warning information is received; and transmitting the emergency warning information to another mobile terminal a plurality of times before the deadline by using a connection that has been established between the mobile terminal and the another mobile terminal for one-to-one communication using a Physical Sidelink Shared CHannel (PSSCH) in a case where the another mobile terminal capable of communicating with the mobile terminal by using Proximity-based Services (ProSe) exists outside an area where radio waves from the base station reach when the mobile terminal receives the emergency warning information.

10. A non-transitory computer-readable storage medium storing a program that causes a computer serving as a mobile terminal for conducting Side Link Relay communication of Fifth Generation New Radio (5G NR) specified by a Third Generation Partnership Project (3GPP) to execute processes comprising:

receiving emergency warning information from a base station, the emergency warning information being information for notification of an emergency situation;

setting a deadline for transmitting the emergency warning information when the emergency warning information is received; and transmitting a broadcast message including the emergency warning information to another mobile terminal a plurality of times before the deadline by using a Physical Sidelink Shared CHannel (PSSCH) in a case where the another mobile terminal capable of communicating with the mobile terminal by using Proximity-based Services (ProSe) exists outside an area where radio waves from the base station reach when the mobile terminal receives the emergency warning information.

11. A communication method performed by a mobile terminal that conducts Side Link Relay communication of Fifth Generation New Radio (5G NR) specified by a Third Generation Partnership Project (3GPP), the method comprising:

receiving emergency warning information from a base station, the emergency warning information being information for notification of an emergency situation;

setting a deadline for transmitting the emergency warning information when the emergency warning information is received; and transmitting the emergency warning information to another mobile terminal a plurality of times before the deadline by using a connection that has been established between the mobile terminal and the another mobile terminal for one-to-one communication using a Physical Sidelink Shared CHannel (PSSCH) in a case where the another mobile terminal capable of communicating with the mobile terminal by using Proximity-based Services (ProSe) exists outside an area where radio waves from the base station reach when receiving the emergency warning information.

12. A communication method performed by a mobile terminal that conducts Side Link Relay communication of Fifth Generation New Radio (5G NR) specified by a Third Generation Partnership Project (3GPP), the method comprising:

receiving emergency warning information from a base station, the emergency warning information being information for notification of an emergency situation;

setting a deadline for transmitting the emergency warning information when the emergency warning information is received; and transmitting a broadcast message including the emergency warning information to another mobile terminal a plurality of times before the deadline by using a Physical Sidelink Shared CHannel (PSSCH) in a case where the another mobile terminal capable of communicating with the mobile terminal by using Proximity-based Services (ProSe) exists outside an area where radio waves from the base station reach when receiving the emergency warning information.

* * * * *